United States Patent
Fujita

(10) Patent No.: US 8,243,336 B2
(45) Date of Patent: Aug. 14, 2012

(54) IMAGE FORMING APPARATUS AND METHOD OF CONTROLLING THE SAME

(75) Inventor: Toru Fujita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 821 days.

(21) Appl. No.: 12/405,023

(22) Filed: Mar. 16, 2009

(65) Prior Publication Data

US 2009/0237739 A1   Sep. 24, 2009

(30) Foreign Application Priority Data

Mar. 21, 2008 (JP) ................................ 2008-072876
Dec. 19, 2008 (JP) ................................ 2008-323071

(51) Int. Cl.
*G06T 5/00* (2006.01)
*H04N 1/407* (2006.01)

(52) U.S. Cl. ........ 358/3.26; 358/1.9; 358/2.1; 358/3.27; 358/3.28; 358/504; 382/112; 382/141; 382/149; 382/151; 382/254; 399/9; 399/12; 399/14; 399/15; 399/18

(58) Field of Classification Search ................... 358/1.9, 358/2.1, 3.26, 3.27, 504; 399/9–37
See application file for complete search history.

(56) References Cited

U.S. PATENT DOCUMENTS

| 5,235,652 | A  | * | 8/1993 | Nally | 382/112 |
|---|---|---|---|---|---|
| 6,446,100 | B1 | * | 9/2002 | Warmus et al. | 715/246 |
| 6,661,978 | B2 | * | 12/2003 | Brewington | 399/19 |
| 6,882,446 | B1 | * | 4/2005 | Tohyama et al. | 358/1.9 |
| 7,505,984 | B1 | * | 3/2009 | Nevill-Manning et al. | 1/1 |
| 7,672,603 | B2 | * | 3/2010 | Yamamoto et al. | 399/49 |
| 7,835,042 | B2 | * | 11/2010 | Sato et al. | 358/501 |
| 7,916,346 | B2 | * | 3/2011 | Matsuzaki et al. | 358/1.9 |
| 2002/0191219 | A1 | * | 12/2002 | Bondy et al. | 358/1.18 |
| 2003/0175602 | A1 | * | 9/2003 | Kazama | 430/22 |
| 2005/0207635 | A1 | * | 9/2005 | Lazar et al. | 382/139 |

FOREIGN PATENT DOCUMENTS

JP   2002-342039   11/2002

* cited by examiner

*Primary Examiner* — Richard Zhu
(74) *Attorney, Agent, or Firm* — DLA Piper LLP (US)

(57) ABSTRACT

An image forming apparatus embeds second class data that is different from sheet to sheet in first class data that is common throughout a printing operation. First and second unfolding sections unfold the first and second class data to image data. An image carrying body image examination section compares image data unfolded by the second unfolding section and picked up image data unfolded by the first unfolding section and prepared by an image carrying body image pickup section, and an intermediate transfer body image examination section compares image data unfolded by the second unfolding section and picked up image data unfolded by the first unfolding section and prepared by an intermediate transfer body image pickup section.

15 Claims, 20 Drawing Sheets

IMAGE FORMING APPARATUS AND METHOD OF CONTROLLING THE SAME

CROSS REFERENCE TO RELATED APPLICATIONS

This application is based upon and claims the benefit of priority from prior Japanese Patent Applications No. 2008-72876 filed Mar. 21, 2008, and No. 2008-323071 filed Dec. 19, 2008, the entire contents of which are incorporated herein by reference.

BACKGROUND

1. Technical Field

The present invention relates to an image forming apparatus designed to operate for so-called variable printing of printing an image on a sheet of recording medium, embedding variable data that vary from printed sheet to printed sheet in fixed data (common data) such as form data that are common to all the printed sheets, and to a method of controlling such an image forming apparatus.

2. Related Background Art

So-called variable printing has become available in recent years. It is a high speed printing technique for producing a large number of printed sheets of recording medium such as direct mail letters and credit card bill letters by registering form data that are fixed data (common data) to an image forming apparatus in advance and synthetically combining variable data that vary from sheet to sheet on which images are to be printed and the registered form data for each sheet.

JP-A-2002-342039 (Patent Document 1) discloses an output system for variable printing including output apparatus that process data to be registered so as to be used for a large number of times (to be referred to as master data hereinafter) and variable data including data associated with the master data and output data according to the master data and the variable data, a host computer connected to each of the output apparatus by way of a bidirectional communication line and an output server. The output server includes a master data analysis means for receiving the master data from the host computer and analyzing, unfolding and storing the master data, a management means for managing management information including the unfolded master data unfolded by the analyzing means and management information on each transmission of master data to any of the output apparatus, acquiring and managing information relating to the specifications and the performances of all the output apparatus connected to the output server by way of bidirectional communication lines, a first determination means for determining the output apparatus that should hold the unfolded master data according to the information from the management means and a first output means for outputting information including the unfolded master data to the output apparatus determined by the first determination means, and each of the output apparatus has a registration means for registering the received master data in the internal memory device thereof according to the information including the master data received from the output server.

SUMMARY

An image forming apparatus that can operate for variable printing as described in Patent Document 1 stores data including a part (the second image section) that varies from addressee to addressee (or from customer to customer) such as the names of the customers when printing invitation letters and a part (the first image section) that is common to all the addressees such as the description on the meeting hall. However, the second image section can contain information that cannot be expressed by means of character codes that are completely authorized such as Chinese characters used in Japanese names. Then, such information cannot be printed or printed with wrong characters to consequently give rise to defective printing depending on the character code data mounted in the image forming apparatus. Additionally, an address can involve an extremely large number of characters and overflows from the space assigned to it to also consequently give rise to defective printing. Such defective printing has hitherto been visually checked on all the printed sheets on a one by one basis. It is a cumbersome and time consuming operation. Additionally, all the defective documents containing personal information such as addresses need to be collectively shredded for disposal. It is also a costly and time consuming operation.

In view of the above-identified problems, it is therefore an object of the present invention to provide an image forming apparatus including: a first class data memory section that stores a first class data that is common to a sheet to be printed; a second class data memory section that stores the second class data to be embedded in the first class data at the time of printing, the second class data being different from sheet to sheet to be printed; a first unfolding section that unfolds the first class data and the second class data to a first image data; a second unfolding section that unfolds the first class data and the second class data to a second image data, the second unfolding section being different from the first unfolding section; a first image carrier that carries a first image formed by the first image data unfolded by the first unfolding section; a second image carrier that carries a second image formed by the first image data unfolded by the first unfolding section; a transfer medium that is held in contact with the first image carrier and the second image carrier and to which the first image formed on the first image carrier and the second image formed on the second image carrier are transferred; an image pickup section of the image carrier that picks up the first image of the first image carrier and prepares a first picked up image data; an image pickup section of the transfer medium that picks up an image transferred to the transfer medium and prepares a second picked up image data; an image examination section of the image carrier that examines an image corresponding to the second class data by comparing the second image data unfolded by the second unfolding section and the first picked up image data prepared by the image pickup section of the image carrier; and an image examination section of the transfer medium that examines an image corresponding to the first class data by comparing the second image data unfolded by the second unfolding section and the second picked up image data prepared by the image pickup section of the transfer medium.

Preferably, the image forming apparatus as defined above further includes a first color conversion section that is arranged in the first unfolding section, a second color conversion section that is arranged in the second unfolding section, the second color conversion section being different from the first color conversion section, and a third color conversion section that is arranged in the second unfolding section, the third color conversion section being different from the first color conversion section and the second color conversion section.

Preferably, in the image forming apparatus as defined above, a resolution of the first image data generated by the first color conversion section and a resolution of the second image data generated by the second color conversion section are different from each other.

Preferably, in the image forming apparatus as defined above, the resolution of the first image data generated by the first color conversion section and a resolution of the third image data generated by the third color conversion section are different from each other.

Preferably, in the image forming apparatus as defined above, the resolution of the second image data generated by the second color conversion section and the resolution of the third image data generated by the third color conversion section are different from each other.

Preferably, the image forming apparatus as defined above further includes a second defective printing processing section that disposes of the image corresponding to the second class data when the image is determined to be defective by the image examination section of the image carrier.

Preferably, in the image forming apparatus as defined above, the second defective printing processing section is a first image carrier contact/release mechanism that brings the first image carrier into contact with and moves the first image carrier away from the transfer medium.

Preferably, the image forming apparatus as defined above further includes a first defective printing processing section that disposes of the image corresponding to the first class data when the image is determined to be defective by the image examination section of the transfer medium.

Preferably, in the image forming apparatus as defined above, the first defective printing processing section is a cleaning blade that scrapes off the image formed on the transfer medium.

Preferably, in the image forming apparatus as defined above, the first image is formed by a liquid developer containing carrier liquid and toner particles.

Preferably, the image forming apparatus as defined above further includes a squeezing section that removes the carrier liquid from the first image carrier and the second image carrying body.

Preferably, the image forming apparatus as defined above further includes a squeezing device that removes the carrier liquid from the transfer medium.

In another aspect of the present invention, there is provided a method of controlling an image forming apparatus including; storing a first class data that is common to a sheet to be printed in a first class data memory section; storing a second class data to be embedded in the first class data at the time of printing in a second class data memory section, the second class data being different from sheet to sheet to be printed; unfolding the first class data and the second class data to a first image data by means of a first unfolding section; unfolding the first class data and the second class data to a second image data by means of a second unfolding section that is different from the first unfolding section; carrying a first image formed by the first image data unfolded by the first unfolding section on a first image carrier; carrying a second image formed by the first image data unfolded by the first unfolding section on a second image carrier; transferring the first image formed on the first image carrier and the second image formed on the second image carrier to a transfer medium that is held in contact with the first image carrier and the second image carrier; picking up the first image of the first image carrier and preparing a first picked up image data by means of an image pickup section of the image carrier; picking up an image transferred to the transfer medium and preparing a second picked up image data by means of an image pickup section of the transfer medium; examining an image corresponding to the second class data by comparing the second image data unfolded by the second unfolding section and the first picked up image data prepared by image pickup section of the image carrier by means of an image examination section of the image carrier; and examining an image corresponding to the first class data by comparing the second image data unfolded by the second unfolding section and the second picked up image data prepared by the image pickup section of the transfer medium by means of a image examination section of the transfer medium.

Preferably, the method of controlling an image forming apparatus as defined above further includes: disposing of the image corresponding to the second class data by means of a second defective printing processing section when the image is determined to be defective by the image examination section of the image carrier.

Preferably, the method of controlling an image forming apparatus as defined above further includes: disposing of the image corresponding to the first class data by means of a first defective printing processing section when the image is determined to be defective by the image examination section of the image carrier.

Thus, the image forming apparatus and the method of controlling the same according to the present invention can appropriately process defective printing in variable printing and reduce the operation and the labor cost required to check the printed documents that contain personal information.

DESCRIPTION OF THE PREFERRED EMBODIMENTS

Figure 1:
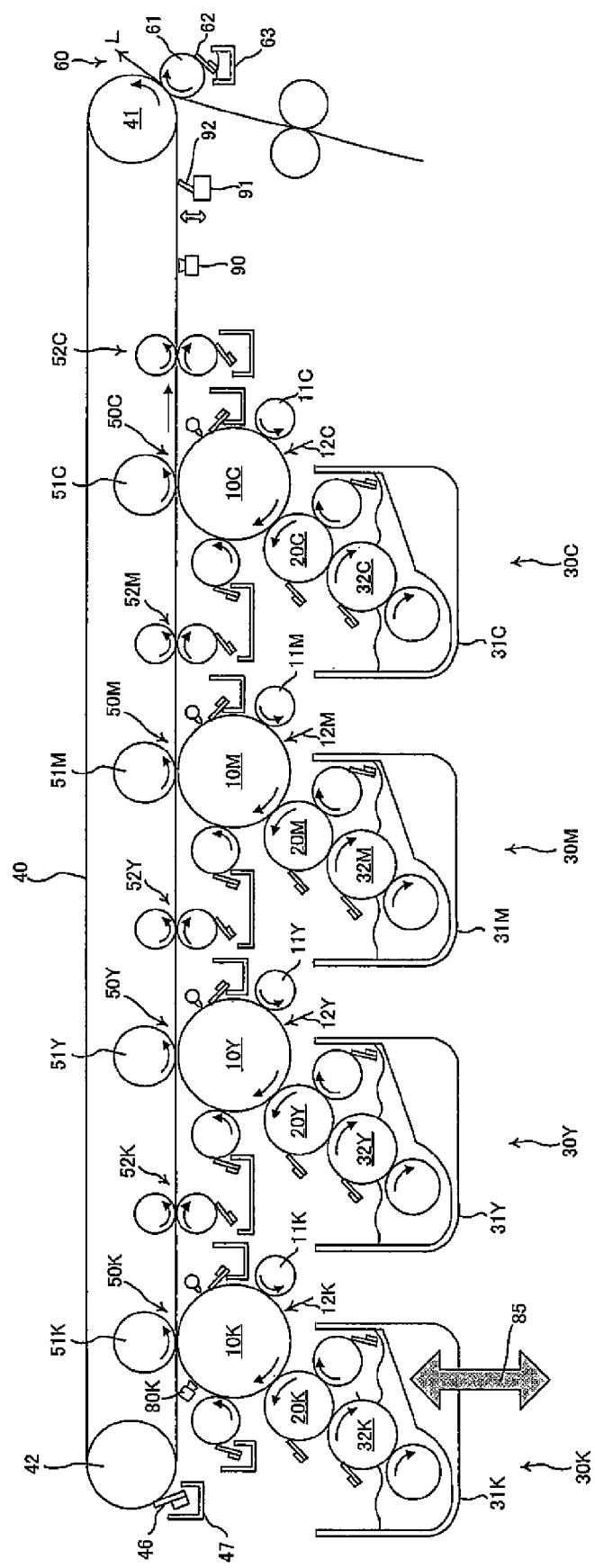
FIG. 1 is a schematic illustration of an image forming apparatus designed for variable printing, showing principal components thereof.

Now, preferred embodiments of the present invention will be described in greater detail by referring to the accompanying drawings. FIG. 1 is a schematic illustration of an image forming apparatus designed for variable printing, showing principal components thereof.

While the embodiments of the present invention that are described hereinafter are wet type image forming apparatus that develop a latent image by means of highly viscous liquid developer prepared by dispersing toner, which is a sold component, into a liquid medium and visualizes the electrostatic latent image, it should be noted here that the present invention is also applicable to dry type image forming apparatus.

Image forming sections of different colors are arranged in a central part of the image forming apparatus and development units 30K, 30Y, 30M and 30C are arranged in a lower part of the image forming apparatus, while an intermediate transfer body 40 and a secondary transfer section 60 are arranged in an upper part of the image forming apparatus.

The image forming sections respectively includes image carrying bodies 10K, 10Y, 10M and 10C, charging rollers 11K, 11Y, 11M and 11C and exposure units 12K, 12Y, 12M and 12C (not shown). Each of the exposure units 12K, 12Y, 12M and 12K has an optical system including a semiconductor laser, a polygon mirror and an F-θ lens. They respectively uniformly electrically charge the image carrying bodies 10K, 10Y, 10M and 10C by means of the charging rollers 11K, 11Y, 11M and 11K and form electrostatic latent images on the electrically charged image carrying bodies 10K, 10Y, 10M and 10C by irradiating laser beams that are modulated according to the input image signal.

The development units 30K, 30Y, 30M and 30C respectively include development rollers 20K, 20Y, 20M and 20C, developer containers (reservoirs) 31K, 31Y, 31M and 31C that store liquid developers of different colors of black (K), yellow (Y), magenta (M) and cyan (C) and anilox rollers 32K, 32Y, 32M and 32C which supplies liquid developers of the different colors from the developer containers 31K, 31Y, 31M and 31C to the development rollers 20K, 20Y, 20M and 20C as principal components and develop the electrostatic latent images formed on the image carrying bodies 10K, 10Y, 10M and 10C by means of liquid developers of the different colors.

The intermediate transfer body 40 is an endless belt that is wound around a drive roller 41 and a tension roller 42 and driven to rotate by the drive roller 41, contacting the image carrying bodies 10K, 10Y, 10M and 1C at respective primary transfer sections 50K, 50Y, 50M and 50C. At the primary transfer sections 50K, 50Y, 50M and 50C, primary transfer rollers 51K, 51Y, 51M and 51C are respectively arranged vis-à-vis the image carrying bodies 10K, 10Y, 10M and 10C with the intermediate transfer body 40 interposed between them and the toner images of the different colors on the image carrying bodies 10K, 10Y, 10M and 10C are sequentially transferred onto the intermediate transfer body 40 one on the other at the respective contact positions of the primary transfer rollers 51K, 51Y, 51M and 51C and the image carrying bodies 10K, 10Y, 10M and 10C to produce a full color toner image on the intermediate transfer body 40.

The secondary transfer unit 60 includes a secondary transfer roller 61 that is arranged vis-à-vis a belt drive roller 41 with the intermediate transfer body 40 interposed between them and a cleaning device that includes a secondary transfer roller cleaning blade 62 and a developer collection section 63. The monochromatic toner image or the full color toner image formed on the intermediate transfer body 40 is transferred onto a recording medium, which may be a sheet of paper, film or cloth, being transferred along recording medium conveyance route L at the transfer position where the secondary transfer roller 61 is arranged.

In the following description, a roller, for example, that is arranged in a preceding stage relative to a roller arranged in a succeeding stage in the entire image forming process is referred to as upstream roller. The nip section arranged between the intermediate transfer body 40 and the secondary transfer roller 61 is referred to as "transfer nip section" hereinafter.

The intermediate transfer body 40 is wound around the tension roller 42 and the belt drive roller 41 and a cleaning device including an intermediate transfer body cleaning blade 46 and a developer collection section 47 is arranged at the position where the intermediate transfer body 40 is would around the tension roller 42 and the intermediate transfer body cleaning blade 46 is held in contact with the intermediate transfer body 40 at that position.

Figure 2:
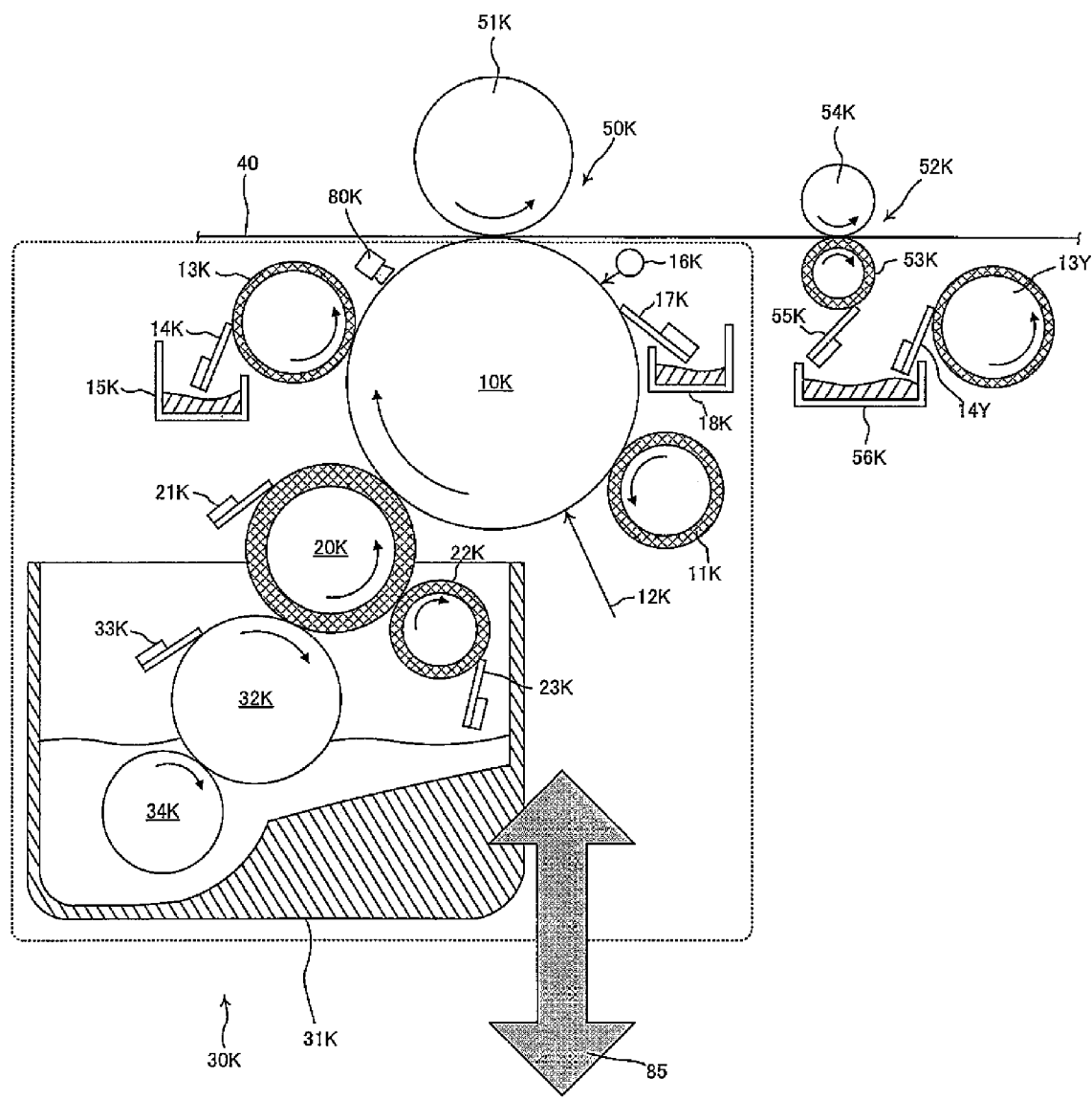
FIG. 2 is a schematic cross-sectional view of an image forming section and a corresponding development unit of the embodiment of FIG. 1.

Now, the image forming sections and the development units of the image forming apparatus of this embodiment will be described below. FIG. 2 is a schematic cross-sectional view of one of the image forming sections and the corresponding development unit of the embodiment, showing principal components thereof. In the following, only the image forming section and the development unit of black (K) will be described because all the image forming sections are structurally same and so are all the development units.

At the image forming section, a cleaning device that includes a latent image eraser device 16K, an image carrying body cleaning blade 17K and a developer collection section 18K, the charging roller 11K, the exposure unit 12K, the development roller 20K of the development unit 30K, another cleaning device that includes an image carrying body squeezing roller 13K, an image carrying body squeezing roller cleaning blade 14K that is an annex to the image carrying body squeezing roller 13K and a developer collection section 15K and an image carrying body image pickup section 80K are arranged along the outer periphery of the image carrying body 10K in the above mentioned order in the sense of rotation thereof.

At the development unit 30K, a cleaning blade 21K, the anilox roller 32K and a toner compression roller 22K are arranged along the outer periphery of the development roller 20K. A carrier quantity regulation blade 23K is arranged at the outer periphery of the toner compression roller 22K. A liquid developer supply roller 34K and the anilox roller 32K are contained in the liquid developer container 31K.

The primary transfer roller 51K of the primary transfer section is arranged along the intermediate transfer body 40 at a position located vis-à-vis the image carrying body 10K and an intermediate transfer body squeezing device 52K that includes an intermediate transfer body squeezing roller 53K, a backup roller 54K, an intermediate transfer body squeezing roller cleaning blade 55K and a developer collection section 56K is arranged at a position downstream relative to the primary transfer roller 51K in the moving direction of the intermediate transfer body 40.

The image carrying body 10K is a photosensitive drum that is a cylindrical member having a photosensitive layer formed on the outer peripheral surface thereof and is typically driven clockwise as shown in FIG. 2. The photosensitive layer of the image carrying body 10K is an organic image carrying member or an amorphous silicon image carrying member. The charging roller 11K is arranged at a position upstream relative to the nip section of the image carrying body 10K and the development roller 20K. A bias of a polarity same as the polarity of charged toner is applied to the charging roller 11K from a power supply device (not shown) so at to by turn electrically charge the image carrying body 10K. The exposure unit 12K is arranged at a position downstream relative to the charging roller 11K in the sense of rotation of the image carrying body 10K so as to irradiate a laser beam onto the image carrying body 10K that is electrically charged by the charging roller 11K in order to form a latent image on the image carrying body 10K.

The development unit 30K includes the toner compression roller 22K, the developer container 31K that stores liquid developer containing carrier liquid and toner dispersed to a weight ratio of about 20% in the carrier liquid, the development roller 20K adapted to carry liquid developer, the anilox roller 32K, the limiting blade 33K, and the supply roller 34K, being provided to agitate liquid developer so as to maintain it in a uniform state and supply liquid developer to the development roller 20K, the toner compression roller 22K that puts the liquid developer carried by the development roller 20K into a state where the toner is compressed and a development roller cleaning blade 21K that cleans the development roller 20K.

The liquid developer contained in the developer container 31K is not a conventional popular volatile liquid developer that is a low concentration (1 to 2 wt %) and low viscosity liquid developer that is volatile at room temperature and formed by using Isopar (trademark: available from Exxon) as carrier but a high concentration and high viscosity (about 30 to 10,000 mPa·s) liquid developer showing a toner solid concentration of about 20% and formed by adding a solid component with average particle diameter 1 μm prepared by dispersing a coloring agent such as a pigment into thermoplastic resin into a liquid solvent such as organic solvent, silicon oil, mineral oil or edible oil with a dispersant.

The anilox roller 32K is a cylindrical member having projections and recesses on the surface thereof that are formed by uniformly cutting fine spiral grooves in order to make it carry liquid developer on its surface with ease. The limiting blade 33K is an elastic blade formed by coating an elastic member on the surface. It limits and regulates the thickness and the quantity of the liquid developer being carried and conveyed by the anilox roller 32K so as to adjust the quantity of liquid developer to be supplied to the development roller 20K.

The development roller 20K is driven to rotate around its axis of rotation counterclockwise as shown in FIG. 2. The development roller 20K is formed by arranging an elastic layer of polyurethane rubber or the like on the outer periphery of an inner core that is made of metal such as iron. The development roller cleaning blade 21K is typically made of rubber and held in contact with the surface of the development roller 20K. It is arranged at a position downstream relative to the development nip section where the development roller 20K contacts the image carrying body 10K in the sense of rotation of the development roller 20K so as to scrape off and remove the liquid developer remaining on the development roller 20K.

The toner compression roller 22K includes a means for boosting the charged bias of the surface of the development roller 20K. An electric field is applied from the side of the toner compression roller 22K to the developer being conveyed by the development roller 20K at a toner compression site where the toner compression roller 22K is held in sliding contact with the development roller 20K as shown in FIG. 2.

On the other hand, the developer that is being carried by the development roller 20K and subjected to toner compression is used to develop the latent image on the image carrying body 10K at the development nip section where the development roller 20K contacts the image carrying body 10K as a desired electric field is applied to it. The residual developer left after the development of the latent image is scraped off and removed by the development roller cleaning blade 21K and added to the liquid developer in the reservoir 31K for reuse. The carrier and the toner added to the reservoir 31K are not in a mixed color condition.

The image carrying body squeezing device is arranged vis-à-vis the image carrying body 10K at a position downstream relative to the development roller 20K to collect the surplus developer left after the development for producing the toner image on the image carrying body 10K. As shown in FIG. 2, it includes an image carrying body squeezing roller 13K that is an elastic roller member formed by arranging an elastic body on the surface and held in sliding contact with the image carrying body 10K and a cleaning blade 14K pressed against and held in sliding contact with the image carrying body squeezing roller 13K to clean the image carrying body squeezing roller 13K. The image carrying body squeezing device collects the surplus carrier and the unnecessary fogging toner from the developer consumed for developing the latent image on the image carrying body 10K to raise the content ratio of toner particle in the visualized image.

The image carrying body image pickup section 80K is a scan camera for observing the developed image between the development unit for the black image carrying body 10K and the primary transfer section. The scan camera may be a line scan camera formed by using a CCD or a CMOS or an area scan camera.

In variable printing, the address and the name that differ from addressee to addressee are more often than not printed in black. Therefore, the black image on the image carrying body 10K is shot by the image carrying body image pickup section 80K and checked for printing defects, if any.

An intermediate transfer body image pickup section 90 that is similar to such an image carrying body image pickup section 80K is provided according to the present invention to observe the image on the intermediate transfer body 40. The first class image date that are common to all the printed sheets of a same set are more often than not printed in full color and therefore the image on the intermediate transfer body 40 is shot by the intermediate transfer body image pickup section 90 and checked to detect errors, if any. Particularly, a color scan camera is employed for the scan camera for shooting the image on the intermediate transfer body 40.

In this embodiment, the image carrying body 10K is brought into contact and moved away from the intermediate transfer body 40 by means of a black image carrying body contact/release mechanism 85 that is a mechanism to move up and down the entire development unit 30K. When, for example, a printing defect is detected from the data of the image picked up by the image carrying body image pickup section 80K, the defective image can be prevented from being printed by moving the image carrying body 10K away from the intermediate transfer body 40 and the toner on the image carrying body 10K can be collected for reuse by means of the black image carrying body contact/release mechanism 85.

In the primary transfer section 50K, the developed toner image on the image carrying body 10K is transferred onto the intermediate transfer body 40 by means of the primary transfer roller 51K. Note that the image carrying body 10K and the intermediate transfer body 40 are driven to move at a same speed to lessen the drive load of driving them to rotate and move and suppress the effect of external turbulences on the visible toner image on the image carrying body 10K.

The intermediate transfer body squeezing device 52K is arranged at a position downstream relative to the primary transfer section 50K to execute a process of removing the surplus carrier liquid from the surface of the intermediate transfer body 40 and raising the content ratio of toner particles in the visualized image.

Like the image carrying body squeezing device, the intermediate transfer body squeezing device 52K includes an intermediate transfer body squeezing roller 53K that is an elastic roller member formed by arranging an elastic body on the surface and held in sliding contact with the intermediate transfer body 40, a backup roller 54K arranged vis-à-vis the intermediate transfer body squeezing roller 53K with the intermediate transfer body 40 interposed between them and a cleaning blade 55K pressed against and held in sliding contact with the intermediate transfer body squeezing roller 53K to clean the surface of the roller 53K, and a developer collection section 56K and has a function of collecting the surplus carrier and the unnecessary fogging toner from the developer transferred onto the intermediate transfer body 40 for primary transfer.

Figure 3:
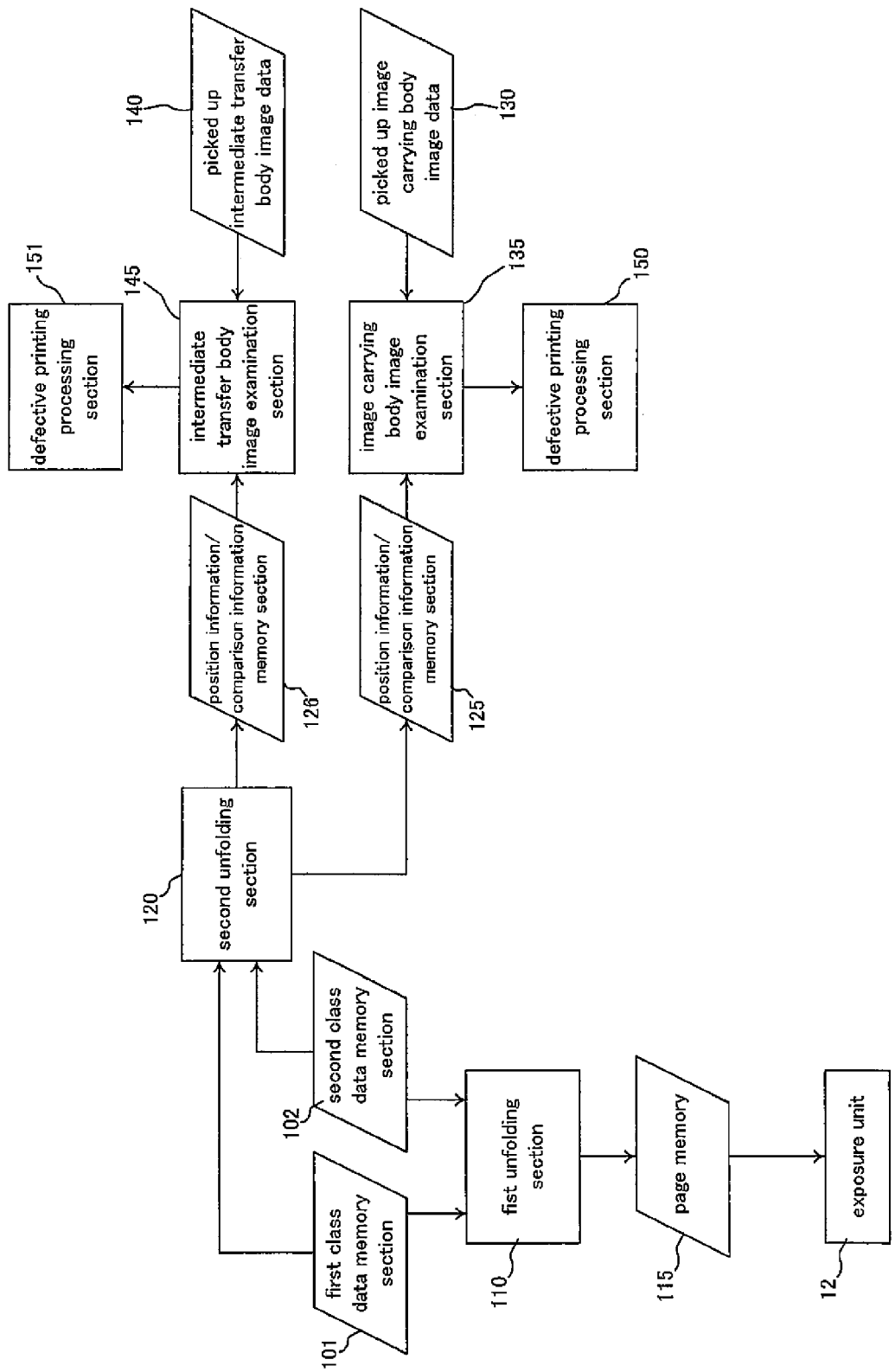
FIG. 3 is a schematic block diagram of the arrangement of the embodiment of FIG. 1 for executing a variable printing process.

Now, the flow of data that takes place when an image forming apparatus according to the present invention executes a variable printing process will be described below. FIG. 3 is a schematic block diagram of the arrangement of the above-described embodiment of the invention for executing a variable printing process. In FIG. 3, there are shown a first class data memory section 101, a second class data memory section 102, a first unfolding section 110, a page memory 115, an exposure unit 12, a second unfolding section 120, position information/comparison information memory sections 125 and 126, picked up image carrying body image data 130, an image carrying body image examination section 135, picked up intermediate transfer body image data 140, an intermediate transfer body image examination section 145 and defective printing processing sections 150 and 151.

FIG. 3 schematically illustrates the configuration of the control system of an image forming apparatus according to the present invention. The first class data stored in the first class data memory section 101 are fixed data (common data) such as form data and the second class data stored in the second class data memory section 102 are variable data such as personal information.

As the data stored in the first class data memory section 101 and those stored in the second class data memory section 102 are input to the first unfolding section 110 and the second unfolding section 120, both of them unfold the first class data and the second class data to produce first class image data and second class image data. The first unfolding section 110 and the second unfolding section 120 are arranged so as to be independent from each other.

The first class image data and the second class image data that are unfolded by the first unfolding section 110 are then arranged in the page memory 115 to synthesize image data in such a way that the second class image data are embedded in the first class image data.

The synthesized image data formed by combining the first class image data and the second class image data that are unfolded on the page memory 115 are then written onto the image carrying body 10 by the exposure unit 12.

The first class image data and the second class image data that are unfolded by the second unfolding section 120 are then transmitted to the position information/comparison information memory sections 125 and 126. The position information/comparison information memory section 125 sends out the position information of the second class image data in the first class image data and information of the second class image data to the image carrying body image examination section 135 as comparison information.

The position information/comparison information memory section 126 sends out the position information of the first class image data and the information of the first class image data to the intermediate transfer body image examination section 145 as comparison information. In other words, the position data of the second class image data in the image being printed and the data contents of the second class image data are sent to the image carrying body image examination section 135 and the position data of the first class image data in the image being printed and the data contents of the first class image data are sent to the intermediate transfer body image examination section 145.

The picked up image carrying body image data 130 are picked up image data that are picked up and prepared by the image carrying body image pickup section 80K and the image carrying body image examination section 135 determines if the formed image is good or no-good on the basis of the second class image data, using the picked up image data from the image carrying body image pickup section 80, the second class image data and the position data thereof.

The picked up intermediate transfer body image data 140 are picked image data picked up and prepared by the intermediate transfer body image pickup section 90 and the intermediate transfer body image examination section 145 determines if the formed image is good or no-good on the basis of the first class image data, using the picked up image data from the intermediate transfer body image pickup section 90, the first class image data and the position data thereof.

The second class image data include data on letters relating to personal information and other information to a large extent so that they need to be processed for high resolution but does not need to be processed for full color. On the other hand, the first class image data does not need to be processed for high resolution but need to be processed for full color. With the arrangement of this embodiment, the first class image data and the second class image data are separately examined for printing defects so that they can be subjected to different respective processes that are suitable for them. For example, the image carrying body image examination section uses monochromatic image data of high resolution, whereas the intermediate transfer body image examination section uses color data of low resolution to reduce the required memory capacity and also the load of the processes.

As the image is determined to be no-good on the basis of the second class image data by the image carrying body image examination section 135, the defective printing processing section 150 is notified of the determination. The defecting printing process section 150 executes a disposal process on the no-good image in an appropriate way before it is printed. For example, the process that the defective printing processing section 150 executes to prevent a no-good image from being printed may be a process of moving the image carrying body 10K away from the intermediate transfer body 40 by means of the black image carrying body contact/release mechanism 85. Many possible processes are conceivable for the process that the defective printing processing section 150 executes on a no-good image.

Figure 12:
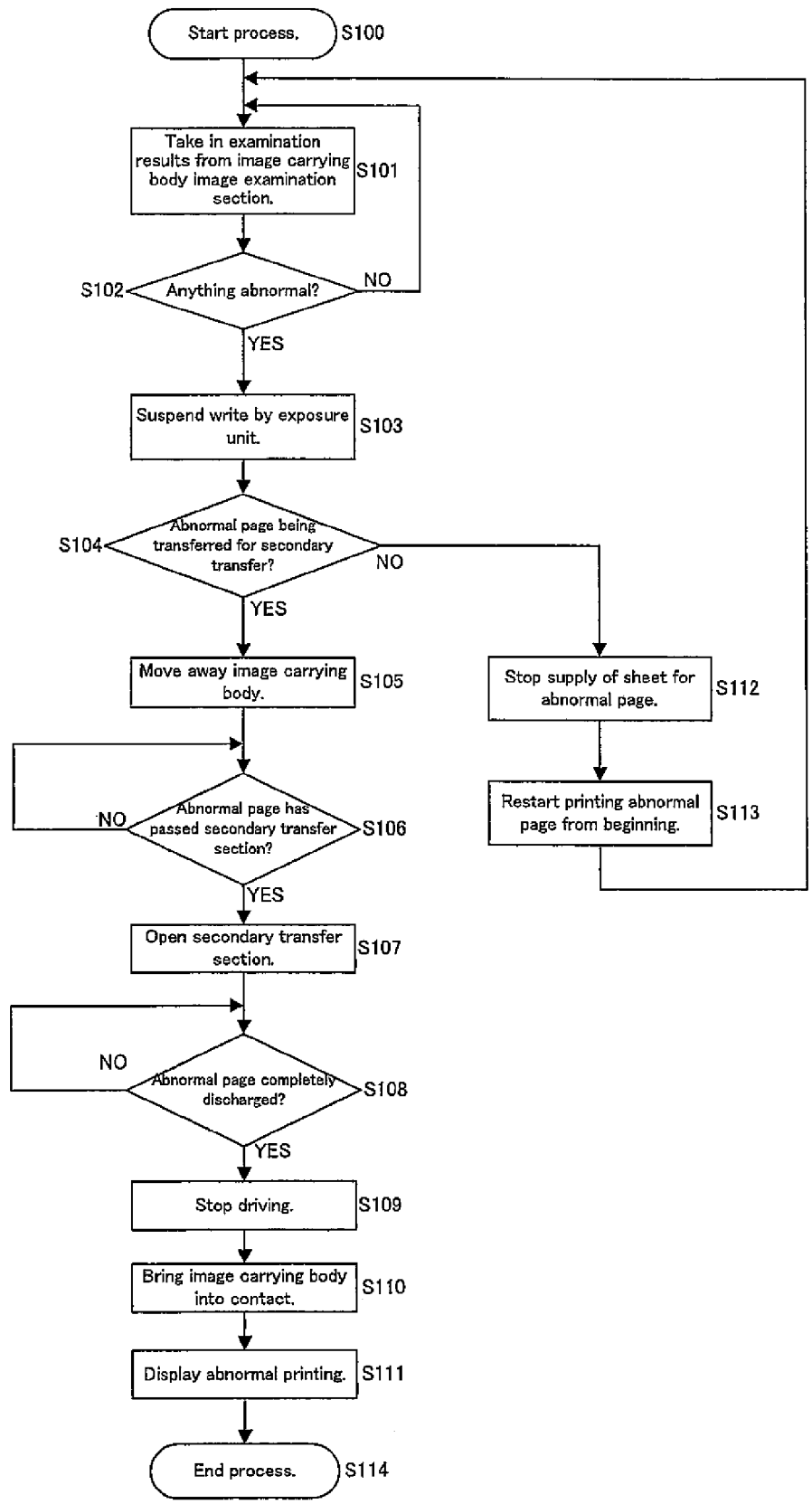
FIG. 12 is a flowchart of the examination for detecting a defective image.

An exemplar process will now be described below. FIG. 12 is a flowchart of the examination for detecting a no-good image by means of the above-described arrangement. Referring to FIG. 12, as a printing process starts, the data prepared by the second unfolding section and stored in the position information/comparison information memory section are sent to the image carrying body image examination section in synchronism with the process of forming an image on the image carrying body. At the same time, the image formed on the image carrying body is shot by the image carrying body image pickup section and taken into the image carrying body image examination section as picked up image carrying body image data. The image carrying body image examination section determines if there is something abnormal on the image on the image carrying body or not by using the two sets of data. If there is nothing abnormal, it just keeps on monitoring data. If something abnormal is detected, the operation of writing image data by the exposure unit is suspended. The succeeding part of the process varies depending on if the secondary transfer operation of transferring the toner image that has something abnormal on a page, or a sheet of paper, has been started at this time point or not. If the secondary transfer operation has not been started, the supply of the sheet of paper onto which the toner image is to be transferred is stopped in order to prevent the toner image of the page having something abnormal from being transferred onto the sheet of paper. Then, the toner image of the page having something abnormal is scraped off typically by a cleaner section without being transferred onto the sheet of paper. The image of the page that had something abnormal is printed again. If, on the other hand, the secondary transfer operation has been started, the photosensitive body is moved away to prevent the toner of the image that is already unnecessarily formed on the photosensitive body from being transferred onto the intermediate transfer body and wait until the sheet of paper passes through the secondary transfer section in the secondary transfer operation. When the sheet of paper passes through the secondary transfer section, the secondary transfer section is released and held waiting until the sheet of paper is discharged to the outside of the apparatus. When the sheet of paper is discharged to the outside of the apparatus, the drive operation of conveying the sheet of paper is stopped and the photosensitive body that has been moved away is pressed against the secondary transfer body. Since the image of the page having something abnormal has been printed and discharged, the user is notified of the abnormal printing and the printing process is suspended.

With another exemplar process of the defective printing processing section 150, the toner image on the intermediate transfer body can be transferred onto the surface of the squeezing roller 53K to erase the toner image on the intermediate transfer body by applying a voltage of the polarity opposite to the polarity of toner to the intermediate transfer body squeezing device 52K. With this arrangement, a massive arrangement of driving the entire development unit to move is not necessary and hence the image forming apparatus can be downsized. With still another exemplar process of the defective printing processing section 150 using the intermediate transfer body squeezing device 52K, the rotation of the squeezing roller 53K may be stopped or reversed to disturb the image on the intermediate transfer body at the nip section of the roller and the intermediate transfer body to prevent the personal information on the image, if any, from being read.

In this embodiment, an intermediate transfer body image scraping off section 91 that is a mechanism for driving a cleaning blade 92 to move up and down is provided so that the cleaning blade 92 may be removably put into contact with the intermediate transfer body 40. When, for example, defective printing is detected from the image data picked up by the intermediate transfer body image pickup section 90, the cleaning blade 92 is brought into contact with the intermediate transfer body 40 by means of the intermediate transfer body image scraping off section 91 to scrape off the image formed on the intermediate transfer body 40 in order to prevent the image from being printed on a recording medium in advance. The cleaning blade 92 may be replaced by a brush or a brush roller.

If an image is determined to be no-good by the intermediate transfer body image examination section 145 on the basis of the first class image data, the defective printing processing section 151 is notified of the no-good image. Then, the defective printing processing section 151 disposes of the no-good image by an appropriate method before it is printed on a recording medium. For example, the above-described intermediate transfer body image scraping off section 91 may be used to form the defective printing processing section 151.

Figure 13:
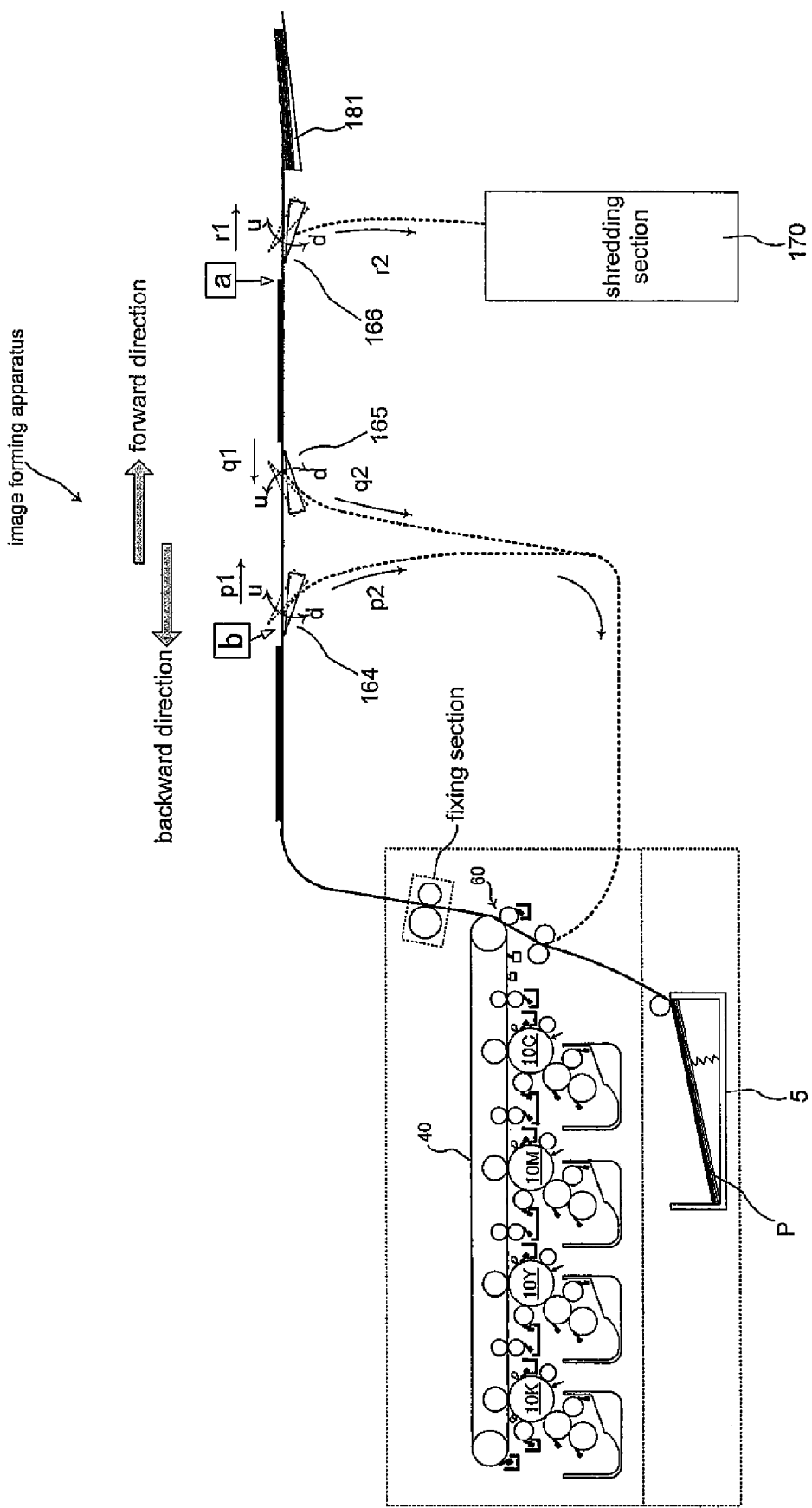
FIG. 13 is a schematic illustration of image forming apparatus according to still another embodiment of the present invention, showing the configuration thereof.

Still another exemplar process of the defective printing processing section 151 will be described below by referring to FIG. 13. Referring to FIG. 13, the image forming apparatus has a recording medium conveyance route for automatic double-sided printing. For double-sided printing, an image is transferred onto one of the opposite surfaces of the recording medium picked up from the sheet feed tray and then the recording medium starts to be conveyed in the opposite direction when its front end gets to "a" after passing through the fixing section and the first conveyance route switching section 164 (in the state of taking position d).

The second conveyance route switching section 165 takes position u by the time when the rear end of the recording medium gets to it and moves to the position indicated by the broken line to lead the recording medium to the downwardly directed recording medium conveyance route indicated by broken line q2. Then, the recording medium is conveyed further and led to the secondary transfer section of the image forming section again to receive an image being transferred onto the other surface thereof. The recording medium is conveyed further and passes through the fixing section once again before it is moved into the discharge tray.

When the outcome of the examination made by the image carrying body image examination section or the intermediate transfer body image examination section tells that the image is defective, the first conveyance route switching section is held to take the position u until the front end of the recording medium gets to the first conveyance route switching section. Then, the recording medium is led to the lower recording medium conveyance route indicated by broken line p2.

The recording medium is conveyed further to get to the secondary transfer section of the image forming section but an image is transferred onto the surface on which a defective image has already been printed because the recording medium has not been turned upside down. Particularly, a solid image is printed on the part of the defective image showing personal information with toner of the same color to make the personal information not readable.

As another example of processing defective printing of FIG. 13, a shredding section 170 may be additionally arranged so that the recording medium carrying a defective image may be conveyed to the shredding section by way of a third conveyance route switching section 166 when the outcome of examination tells that the examined image is defective.

With the above-described arrangement, the operation and the labor cost required to dispose of a defectively printed document that contains personal information can be reduced.

A host computer (not shown) that is connected to an image forming apparatus according to the present invention may be employed to form the first class data memory section 101, the second class data memory section 102 and the second unfolding section 120.

With the above-described arrangement, defective printing can be processed appropriately in variable printing and the operation and the labor cost required to check the printed documents that contain personal information can be reduced.

Figure 4:
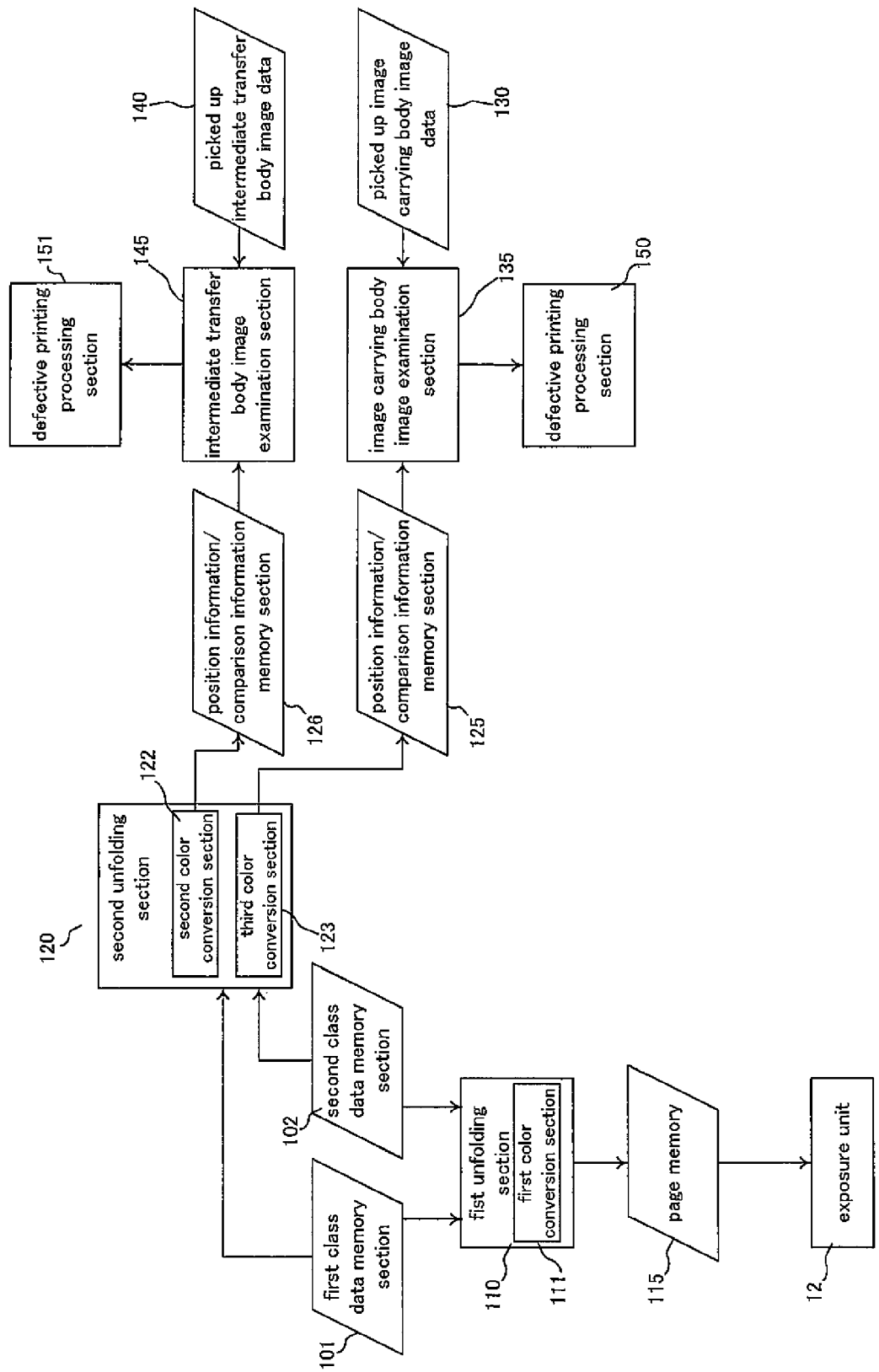
FIG. 4 is a schematic block diagram of the arrangement for executing a variable printing process according to another embodiment of the present invention.

Now, another embodiment of the present invention will be described below. FIG. 4 is a schematic block diagram of this embodiment of image forming apparatus that is adapted to variable printing. The embodiment of FIG. 4 differs from the embodiment of FIG. 3 in that a first color conversion section 111 is arranged in the first unfolding section 110 and a second color conversion section 122 and a third color conversion section 123 are arranged in the second unfolding section 120.

Figure 5:
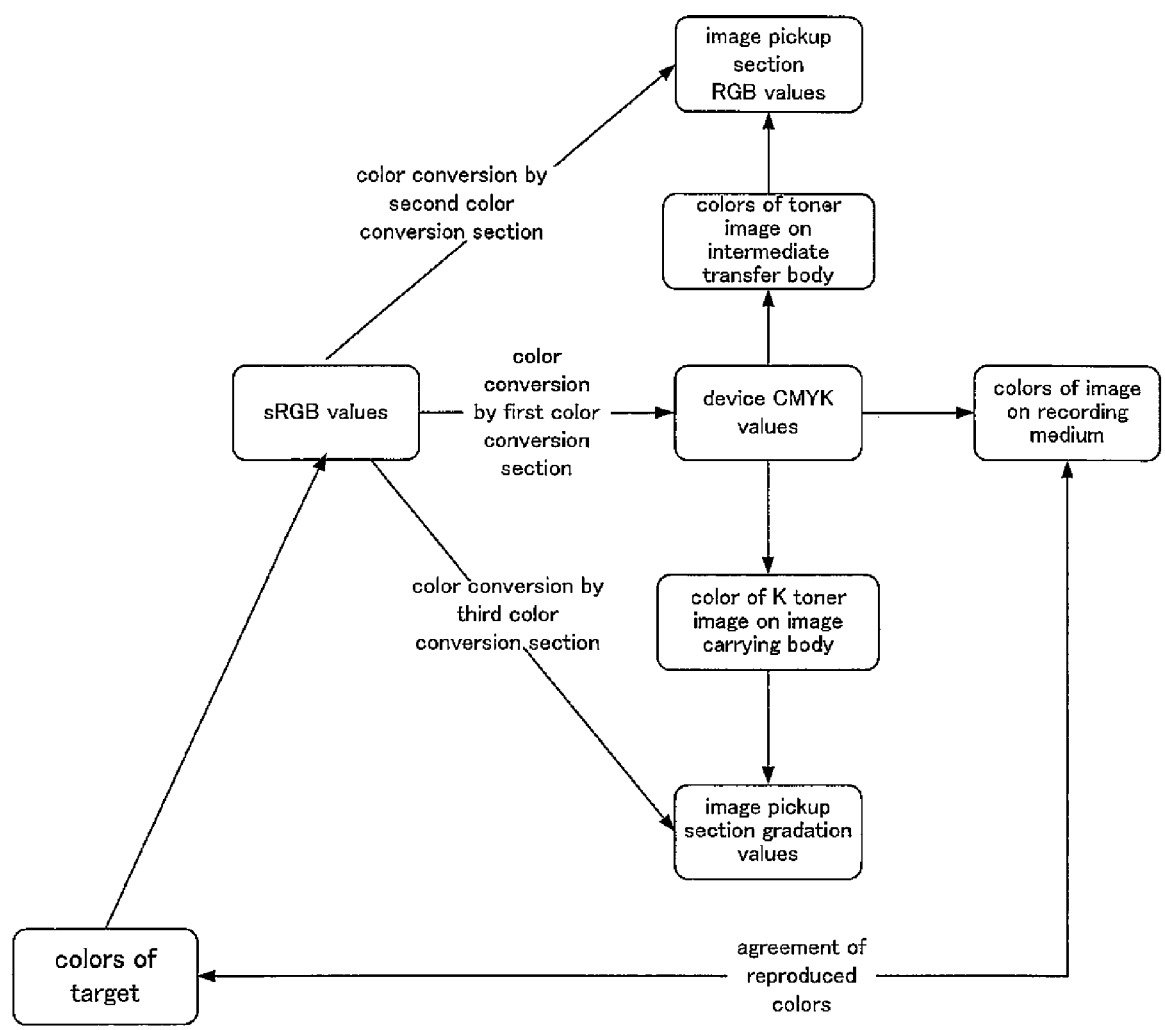
FIG. 5 is a schematic conceptual illustration of a data conversion process that is executed by a color conversion section.

Now, the data conversion operation of the first color conversion section 111, the second color conversion section 122 and the third color conversion section 123 will be described below. FIG. 5 is a schematic conceptual illustration of a data conversion process that is executed by a color conversion section.

Both the first class image data and the second class image data are described in terms of a color coordinate system, which may be an RGB system that makes an image shown on a display appear natural or a CMYK system that makes an image printed by an offset printing machine appear natural. Such systems are different from the CMYK color coordinate system that is employed when an image is output on a recording medium by an image forming apparatus.

Thus, it is necessary to execute a color conversion process on the image that is unfolded to produce image data by the first unfolding section 110 as RGB data or CMYK data so as to make it to be reproduced in the right colors on a recording medium. The first color conversion section 111 is responsible for such a process.

On the other hand, the picked up image carrying body image data 130 and the picked up intermediate transfer body image data 140 output respectively from the image carrying body image pickup section 80 and the intermediate transfer body image pickup section 90 for the image carrying body image examination section 135 and the intermediate transfer body image examination section 145 are RGB data specific to the device that are picked up as monochromatic gradation values not on the recording medium but on the image carrying body or the color values on the intermediate transfer body.

According to the present invention, the data in the format of ROB system or that of CMYK system are converted into data of the coordinate system of the picked up image carrying body image data 130 output from the image carrying body image pickup section 80 by means of the third color conversion section 123 and the obtained data are compared with the data from the image carrying body image pickup section 80.

Additionally, the data in the format of ROB system or that of CMYK system unfolded by the second unfolding section 120 are converted into data of the coordinate system of the picked up intermediate transfer body image data 140 output from the intermediate transfer body image pickup section 90 by means of the second color conversion section 122 and the obtained data are compared with the data from the intermediate transfer body image pickup section 90. The second color conversion is employed for the examination of the first class image data on the intermediate transfer body and the third color conversion is employed for the examination of the second class image data on the image carrying body.

FIG. 5 is a schematic illustration of the first, second and third color conversions of an image forming apparatus that employs toner. Image data of a photograph or the like are for expressing the colors of a shot target by means of a particular color coordinate system. In FIG. 5, the colors are expressed by means of an sRGB system that makes an image shown on a display appear natural. With this image forming system, the photograph data expressed by means of a color coordinate system such as an sRGB system are processed to reproduce an image of the shot target on a recording medium with colors that are made close to the original colors as much as possible by transferring it onto a sheet of paper, appropriately combining toners (e.g., CMYK toners) in the image forming apparatus. The first color conversion is for converting the color coordinate values of the given image data into quantities of toners in the image forming apparatus.

On the other hand, the second color conversion differs from the first color conversion. It is for converting the unfolded image data into RGB values of the intermediate transfer body image pickup section 90 for examination. In the image forming apparatus, toners of predetermined quantities are placed on the respective image carrying bodies as a result of the first color conversion and laid one on the other on the intermediate transfer body. The intermediate transfer body image pickup section 90 observes the image formed by laying the different colors one on the other. The colors that the intermediate transfer body image pickup section 90 observes differ from the colors on the recording medium in terms of the following points.

(1) The colors on the intermediate transfer body 40 are shown against a background that may be colored in black, brown or gray unlike the white background color of the recording medium.

(2) Dry toners and some wet toners show respective colors that are produced as light is scattered on the grain boundaries of toner particles before being subjected to a thermal fixing process. Wet toners and liquid inks such as printing inks show respective colors that are influenced by scattering and reflection produced by a dispersant such as the solvent in which a coloring agent is dispersed. Additionally, the scan camera outputs RGB values that are specific to the scan camera and independent from the CMYK values of the printing apparatus. Thus, the second color conversion is totally different from the first color conversion.

The third color conversion is also for converting the unfolded image data into values of the image carrying body image pickup section 80. However, it differs from the second color conversion in that it converts the unfolded image data into monochromatic gradation values. A monochromatic image of one of CMYK is formed on each of the image carrying body image pickup sections 80 of the different colors and the image carrying body image pickup sections 80 observe the respective monochromatic images. In this embodiment, the image carrying body image pickup section 80K observes the color of the K toner on itself. The colors that the image carrying body image pickup sections 80 respectively observe differ from the colors on the recording medium in terms of the following points.

(1) No color overlaying takes place and hence each color is independent.
(2) Each color is shown against a background that may be colored in green or brown unlike the white background color of the recording medium.
(3) Dry toners and some wet toners show respective colors that are produced as light is scattered on the grain boundaries of toner particles before being subjected to a thermal fixing process. Wet toners and liquid inks such as printing inks show respective colors that are influenced by scattering and reflection produced by a dispersant such as the solvent in which a coloring agent is dispersed. Additionally, the scan camera outputs gradation values that are specific to the scan camera and independent from the CMYK values of the image forming apparatus. Thus, the third color conversion is totally different from the first and second color conversions.

With the above-described embodiment, appropriate color conversions are realized at the right place at the right time to reproduce the right colors on the recording medium and properly process the picked up image data of the image carrying body image pickup section 80 and the intermediate transfer body image pickup section 90 to make the determination processes of the image carrying body image examination section 135 and the intermediate transfer body image examination section 145 highly effective. Then, as a result, defective printing can be processed appropriately and the operation and the labor cost required to check the printed documents that contain personal information can be reduced.

Now, another embodiment of the present invention will be described below. This embodiment is a tandem type image forming apparatus as shown in FIG. 1, in which the skew of any of the image carrying bodies 10 is corrected so that the image carrying body image examination sections 135 can make right determinations.

Figure 6A:
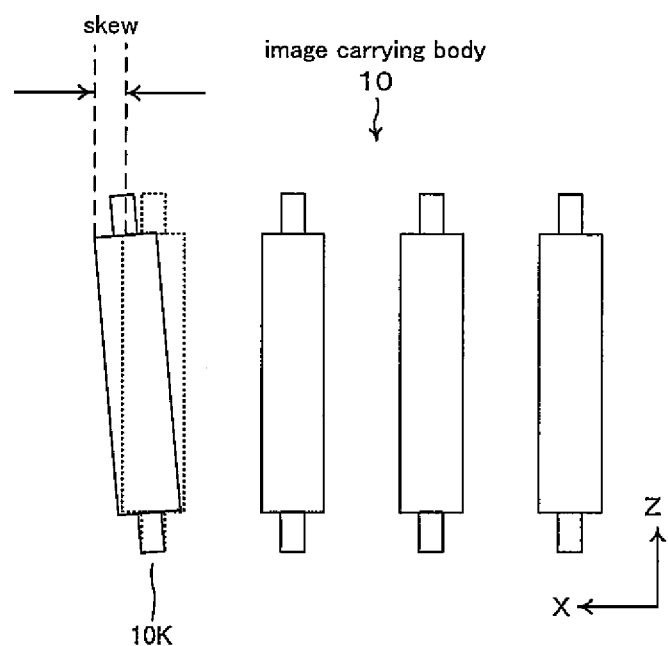
FIG. 6A is a schematic illustration of a skew of any of the image carrying bodies 10 of KCMY of a tandem type image forming apparatus.
Figure 6B:
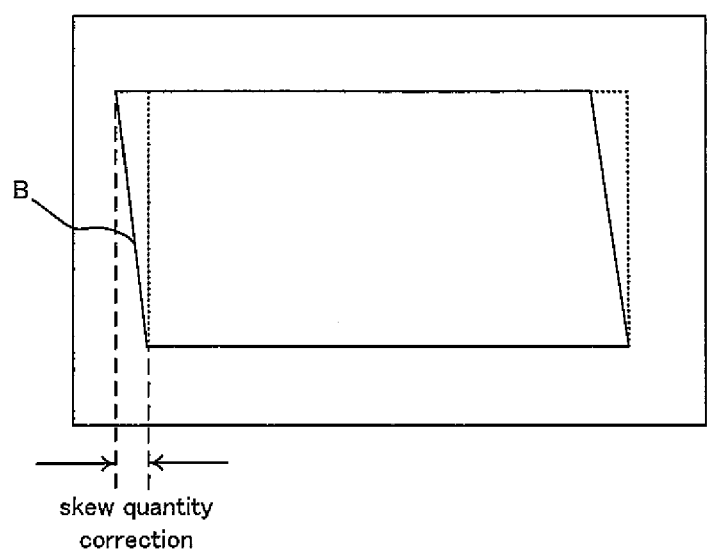
FIG. 6B is another schematic illustration of a skew of any of the image carrying bodies 10 of KCMY of a tandem type image forming apparatus.

FIGS. 6A and 6B are schematic illustrations of a skew of any of the image carrying bodies 10 of KCMY of a tandem type image forming apparatus. In a tandem type image forming apparatus for laying four colors one on the other, all the image carrying bodies 10 are preferably arranged in parallel with each other. In the illustrated instance, the image carrying body 10K is arranged askew relative to the other image carrying bodies. Thus, the horizontal line B drawn on the image carrying body 10K extends askew relative to the horizontal lines of the other colors. This is corrected as a skewed image is formed on the image carrying body 10K.

Figure 7A:
FIG. 7A is a schematic illustration of a skew quantity correction process.
Figure 7C:
FIG. 7C is still another schematic illustration of a skew quantity correction process.
Figure 7B:
FIG. 7B is another schematic illustration of a skew quantity correction process that can be used for the purpose of the present invention.
Figure 7D:
FIG. 7D is still another schematic illustration of a skew quantity correction process.

FIGS. 7A through 7D are schematic illustrations of a skew quantity correction process. When the image carrying body 10 is arranged askew, a horizontal line drawn on it as shown in FIG. 7A extends askew as shown in FIG. 7C. For this reason, the line is actually drawn on the image carrying body 10 to compensate the skew as shown in FIG. 7B so as to reproduce a horizontal line as shown in FIG. 7D. This is a skew quantity correction. If necessary, the skew is corrected independently for the related image carrying body 10, or for the related color. Therefore, it is corrected after subjecting the first class image data and the second class image data that are unfolded by the first unfolding section to an image synthesizing process.

Figure 8:
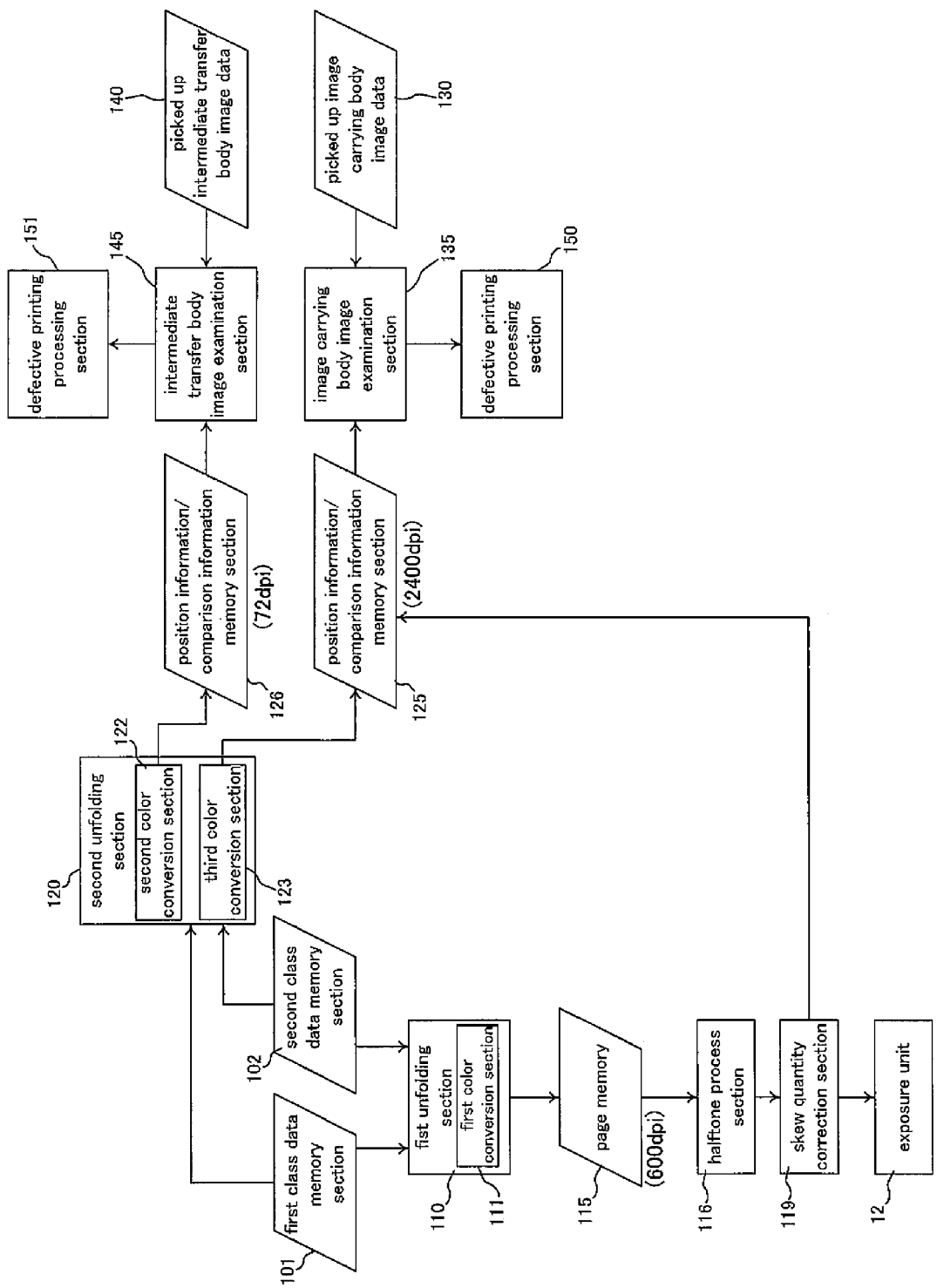
FIG. 8 is a schematic block diagram of the arrangement for executing a variable printing process according to another embodiment of the present invention.

FIG. 8 is a schematic block diagram of the system for examining the image of the second image date in a tandem type image forming apparatus adapted to make skew quantity corrections. This embodiment is designed by taking the resolution of the image pickup devices, which will be described hereinafter, in consideration.

This embodiment differs from the above-described embodiment in that it additionally includes a halftone process section 116 and a skew quantity correction section 119 as shown in FIG. 8. In this embodiment, an image carrying body image pickup section 80K is arranged only at the image carrying body 10K to examine the image on the image carrying body 10K. The position information/comparison information memory section 125 generates image information for examination (the second class image data prepared by taking the skew to be corrected into consideration and the position data thereof) by referring to the information on the skew to be corrected of the black image carrying body 10K. While an image carrying body image pickup section 80K is arranged only at the image carrying body 10K in this embodiment, the information on the skew to be corrected of the image carrying body 10K is sent out to the position information/comparison information memory section 125, a similar arrangement can be provided for the other colors of CMY.

FIG. 8 shows the configuration of the control system in the image forming apparatus. The first class data and the second class data are input and unfolded to produce data that can be used for printing and then they are output to the same page memory 115 so that two images are synthetically combined as in the preceding embodiment. The page memory 115 stores them as data of a predetermined resolution, for example, data of 600 dpi.

The image data have been subjected to the first color conversion process and the page memory 115 stores data decomposed for the different colors of CMYK. In a printing process, the data of the different colors are subjected to a halftone process by the halftone process section 116 and converted into a halftone dot image of a resolution that agrees with the resolution of the print head. The resolution at this time may typically be 600 dpi in the main scanning direction and 1,200 dpi in the sub scanning direction.

Data on the position of the first class image data in the image being printed and the contents of the image are sent to the intermediate transfer body image examination section 145 for the image on the intermediate transfer body 40. The intermediate transfer body image examination section 145 determines if the image is good or no-good on the basis of the first class image data, using the picked up image data from the intermediate transfer body image pickup section 90 and this first class image data.

The first class image data to be sent to the intermediate transfer body image examination section 14S can typically be generated by unfolding the data from the first class image data information source and the second class image data information source on the host computer. The image data are unfolded with a predetermined resolution and this resolution is lower than the resolution of the image to be printed on the recording medium, or 72 dpi, for example. This resolution agrees with the resolution with which the intermediate transfer body image examination section 145 examines the image on the intermediate transfer body. The first class image data are color data that have been subjected to the second color conversion process. A resolution that is lower than the resolution of the print head is sufficient for detecting contents errors and positional errors, if any, of color printing. Particularly, a color image is subjected to a halftone process and hence not suitable for detecting contents errors of color printing because the color of each halftone dot is different from the color to be reproduced.

The second class image data to be send to the image carrying body image examination section 135 can also be generated by unfolding the data from the first class image data information source and the second class image data information source on the host computer. The image data are unfolded with a predetermined resolution and this resolution is higher than the resolution of the image to be printed on the recording medium, or 2,400 dpi, for example. This resolution agrees with the resolution with which the image carrying body image examination section 80 examines the image on the image carrying body. The second class image data is monochromatic gradation data that have been subjected to the third color conversion. The delicate difference, if any, in the letter font can be detected by using such a high resolution for the examination and any installation error such as that the image carrying body 10 and the image carrying body image pickup section 80 are arranged inclined or that the distance between the image carrying body 10 and the image carrying body image pickup section 80 is out of a predetermined range can be compensated with a high degree of precision by digitally correcting data. Additionally, any displacement due to changes with time and/or fluctuations in the environment can be compensated.

Thus, with the above-described embodiment, the skew, if any, is corrected by taking the resolution into consideration and the image carrying body image examination section 135 and the intermediate transfer body image examination section 145 can execute very appropriate determination processes. Then, as a result, defective printing can be processed appropriately and the operation and the labor cost required to check the printed documents that contain personal information can be reduced.

Figure 9:
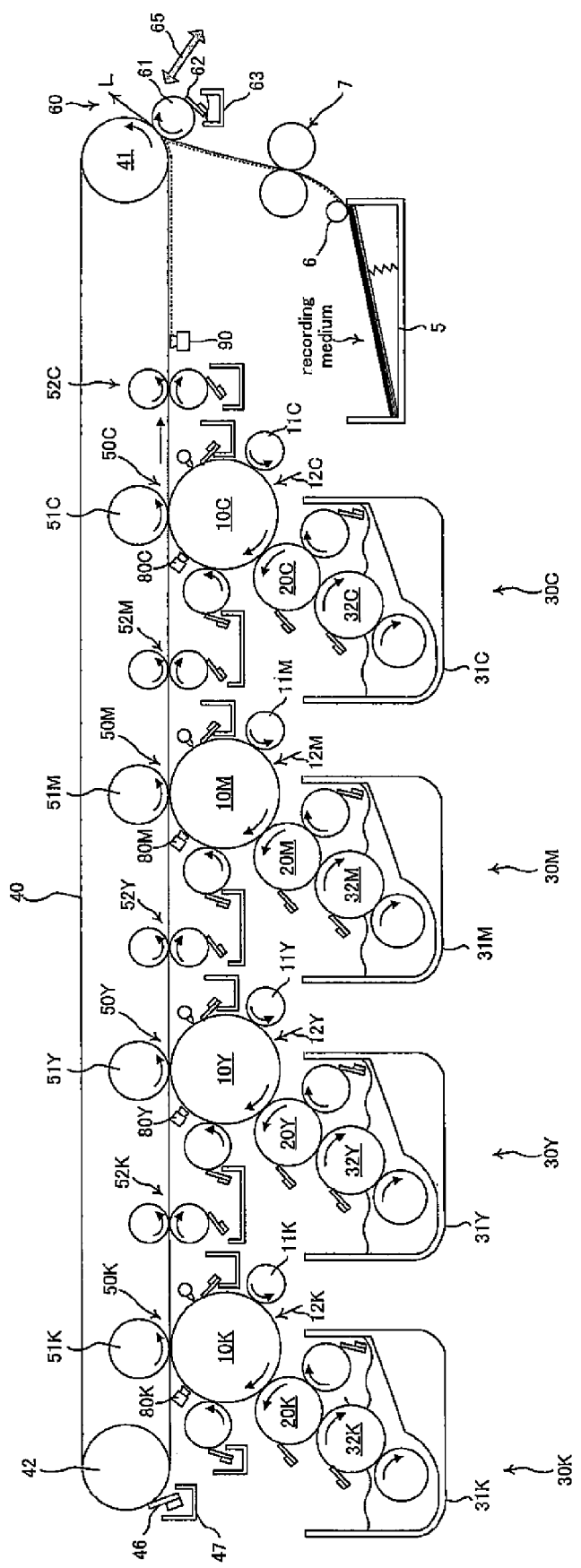
FIG. 9 is a schematic illustration of an image forming apparatus designed for variable printing, showing principal components thereof.

Now, still another embodiment of the present invention will be described below. FIG. 9 is a schematic illustration of this embodiment of image forming apparatus, showing principal components thereof. This embodiment differs from the embodiment shown in FIG. 1 in that image carrying body image pickup sections 80K, 80Y, 80M and 80C are provided for the respective image carrying bodies 10 and the black image carrying body contact/release mechanism 85 is replaced by a secondary transfer roller contact/release mechanism 65.

The image carrying body image pickup sections 80K, 80Y, 80M and 80C are provided to observe and examine the respective image carrying bodies. The technique described for the black image carrying body image pickup section 80K maybe employed for examining the image carrying bodies of the other colors.

The secondary transfer roller contact/release mechanism 65 can bring the secondary transfer roller 61 into contact with and move it away from the intermediate transfer body 40. Additionally, as the secondary transfer roller 61 is brought into contact with and moved away from the intermediate transfer body 40, the secondary transfer roller cleaning blade 62 and the developer collection section 63 are also moved. When defective printing is detected from the picked up image data by any of the image carrying body image pickup sections 80K, 80Y, 80M and 80C, the defective image can be prevented from being printed on a recording medium as the secondary transfer roller 61 is moved away from the intermediate transfer body 40 by the secondary transfer roller contact/release mechanism 65.

Figure 14:
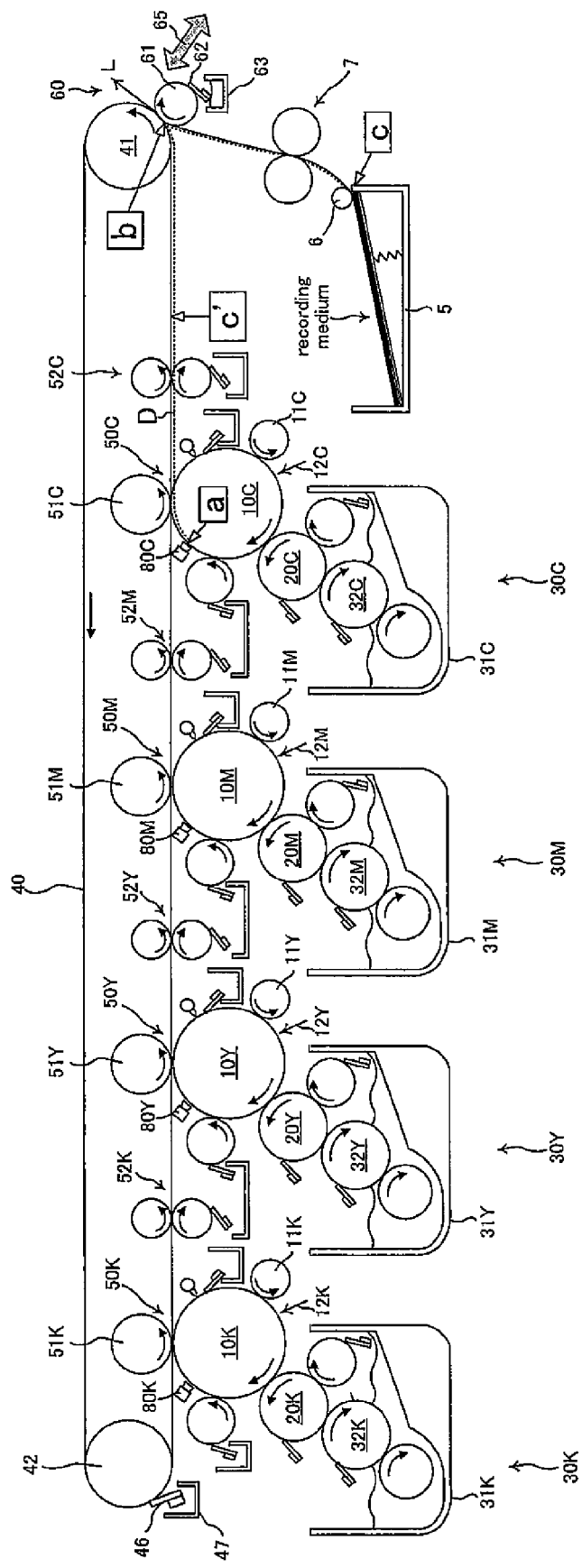
FIG. 14 is a schematic illustration of image forming apparatus according to still another embodiment of the present invention, showing the arrangement of principal components thereof.

Now, still another embodiment of the present invention will be described below. FIG. 14 is a schematic illustration of this embodiment of image forming apparatus, showing principal components thereof. This embodiment differs from the embodiment shown in FIG. 1 in that image carrying body image pickup sections 80K, 80Y, 80M and 80C are provided for the respective image carrying bodies 10 and the black image carrying body contact/release mechanism 85 is replaced by a secondary transfer roller contact/release mechanism 65.

The image carrying body image pickup sections 80K, 80Y, 80M and 80C are provided to observe and examine the respective image carrying bodies. The technique described for the black image carrying body image pickup section 80K maybe employed for examining the image carrying bodies of the other colors.

The secondary transfer roller contact/release mechanism 65 can bring the secondary transfer roller 61 into contact with and move it away from the intermediate transfer body 40. Additionally, as the secondary transfer roller 61 is brought into contact with and moved away from the intermediate transfer body 40, the secondary transfer roller cleaning blade 62 and the developer collection section 63 are also moved. When defective printing is detected from the picked up image data by any of the image carrying body image pickup sections 80K, 80Y, 80M and 80C, the defective image can be prevented from being printed on a recording medium as the secondary transfer roller 61 is moved away from the intermediate transfer body 40 by the secondary transfer roller contact/release mechanism 65.

In FIG. 14, 5 denotes a sheet supply cassette and 6 denotes a pickup roller while 7 denotes a gate roller.

In FIG. 14, a denotes the observation point that the image carrying body image pickup section 80C (the most downstream image pickup section in the image forming process) watches and c denotes the sheet feed starting point of the sheet supply cassette 5, while b denotes the nip entrance point of the secondary transfer section.

The operation of conveying a recording medium starts at the sheet feed starting point c and the image on the intermediate transfer body 40 moves from c' to b while the recording medium gets to b from c. (The point where the image on the intermediate transfer body 40 is located when recording medium is at point c is defined as point c'). The front end of the image on the intermediate transfer body 40 and the front end of the recording medium get to the transfer section b at the same time as the recording medium is conveyed from the sheet supply cassette 5 when the front end of the image on the intermediate transfer body 40 gets to point c'. According to the present invention, the distance from the observation point a to point c' is defined to be longer than the length of the recording medium (as measured in the moving direction of the recording medium). With this arrangement, if the tail end of the image is at point a, the front end of the image does not get to point c'. Thus, if a defect is detected in a rear end part of the image, the operation of conveying the recording medium from the sheet supply cassette 5 has not started yet at that time so that the operation of printing a defective image on the recording medium can be prevented by suspending the operation of conveying the recording medium from the sheet supply cassette 5. Then, the recording medium is prevented from being wasted.

Figure 15:
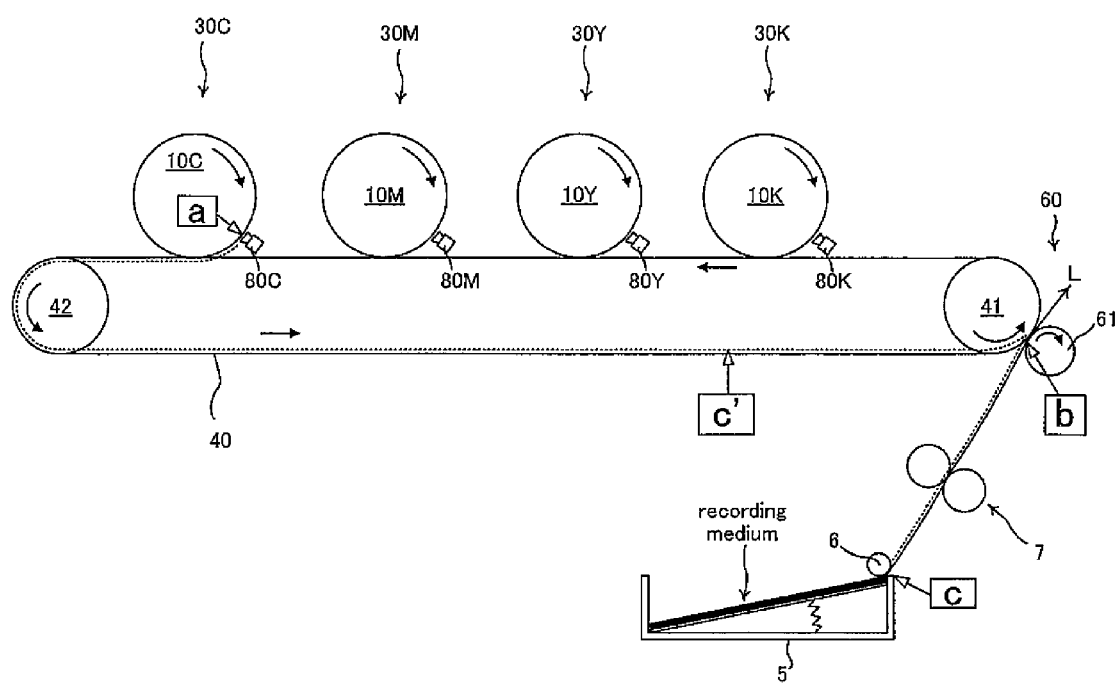
FIG. 15 is a schematic illustration of image forming apparatus according to still another embodiment of the present invention, showing an exemplary layout of principal components thereof.

FIG. 15 is a schematic illustration of image forming apparatus according to still another embodiment of the present invention, showing the layout of principal components thereof. As shown in FIG. 15, the image forming units including the image carrying bodies 10 and the development device are arranged on and above the intermediate transfer belt. With this arrangement, the intermediate transfer body 40 can be made shorter than its counter of the image forming apparatus shown in FIG. 14 so that the entire image forming apparatus can be downsized.

Figure 10:
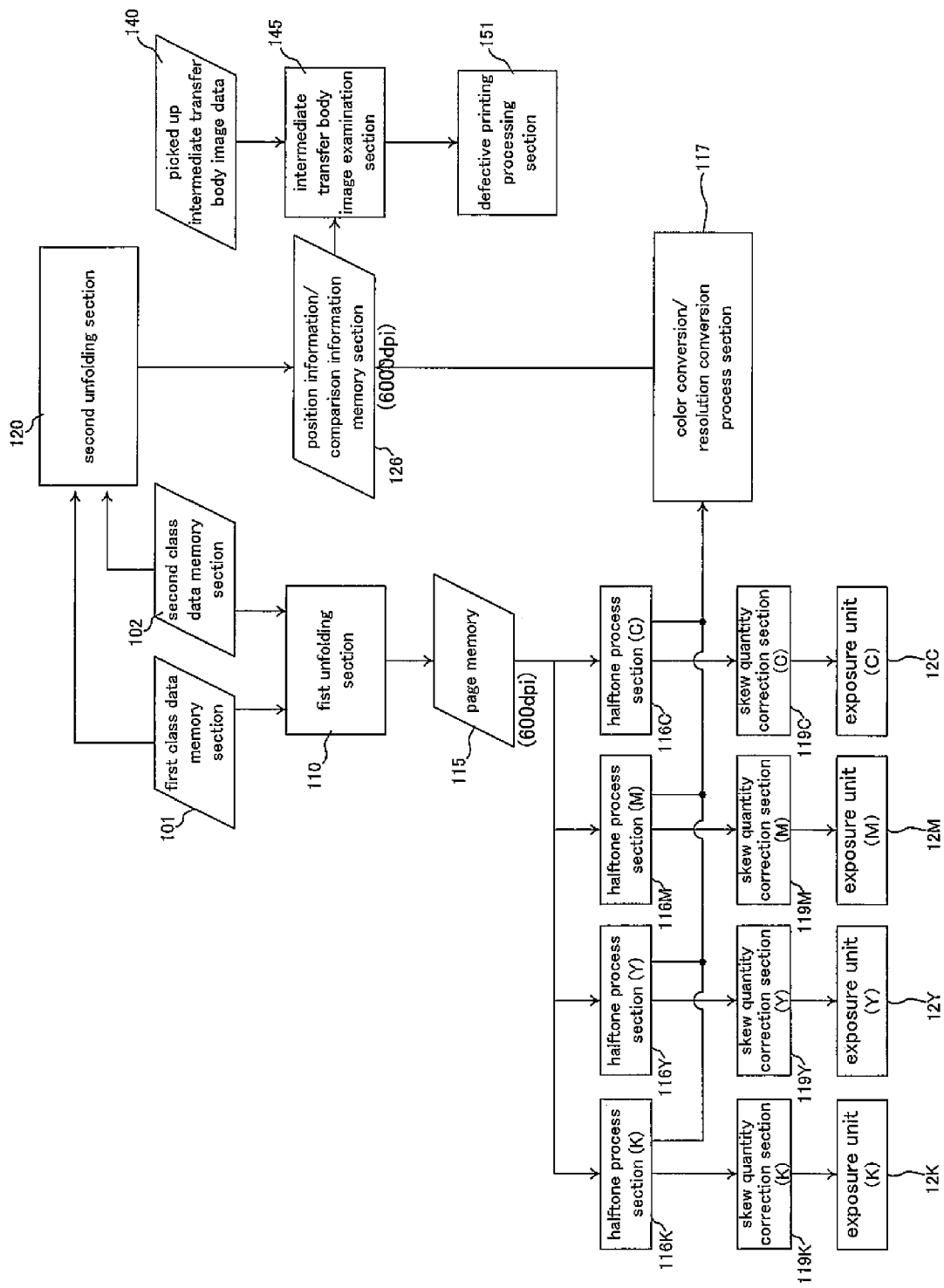
FIG. 10 is a schematic block diagram of the embodiment of image forming apparatus of FIG. 8.

Now, still another embodiment of the present invention will be described below. FIG. 10 is a schematic block diagram of this embodiment of image forming apparatus. The control system of this embodiment is adapted to detect the first class image data with a resolution higher than the resolution of the page memory 115 unlike the preceding embodiments. The arrangement relating to the image carrying body image examination section 135 is omitted from FIG. 10.

Figure 11:
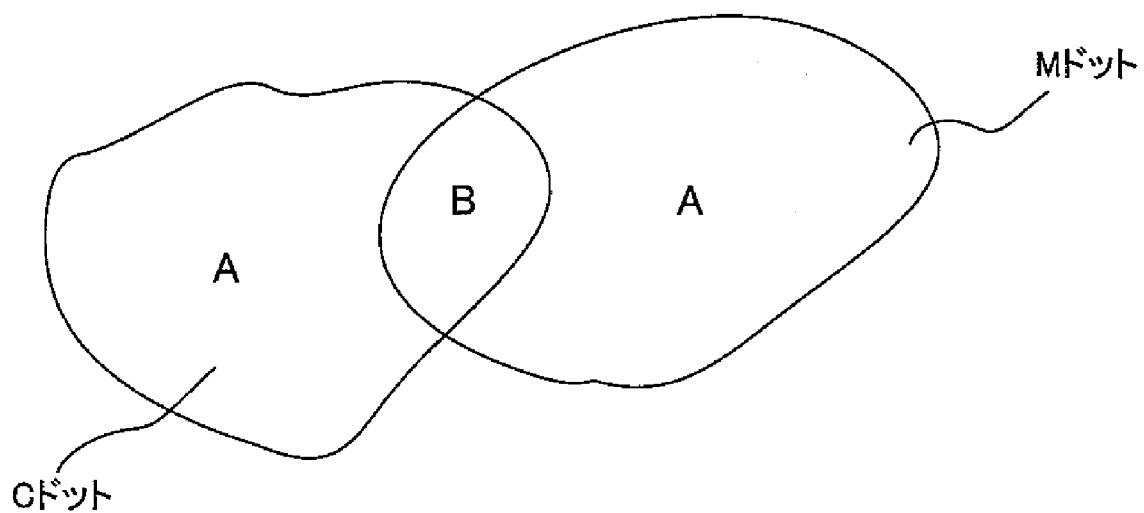
FIG. 11 is a schematic illustration of halftone dots that lie one on the other.

The image data of the different colors subjected to respective halftone processes by the halftone process sections 116K, 116Y, 116M and 116C are sent to the exposure units 12K, 12Y, 12M and 12C by way of skew quantity correction sections 119K, 119Y, 119M and 119C. In this embodiment, the data are input to color conversion/resolution conversion sections and subjected to a color conversion/resolution conversion process there immediately before being sent for skew quantity correction to prepare comparison data to be used for examination. The color conversion is to make it possible to see how the color of each halftone dot (the color of area A in FIG. 11) of each of CMYK and the color produced when such halftone dots are laid one on the other (the color of area B in FIG. 11) will be detected by the intermediate transfer body image pickup section 90. The resolution conversion is a conversion of resolution to a degree that is not less than twice, preferably about ten times, of the resolution of the page memory so as to make it possible to detect the contour and the color of each halftone dot. With this arrangement, it is possible to detect if each halftone dot is reproduced to a desired size, if the quantity and the thickness of the ink layer of each halftone dot that contains toner are proper to show the right color and if the desired positional arrangement of halftone dots of the four colors of CMYK is achieved.

Figure 16:
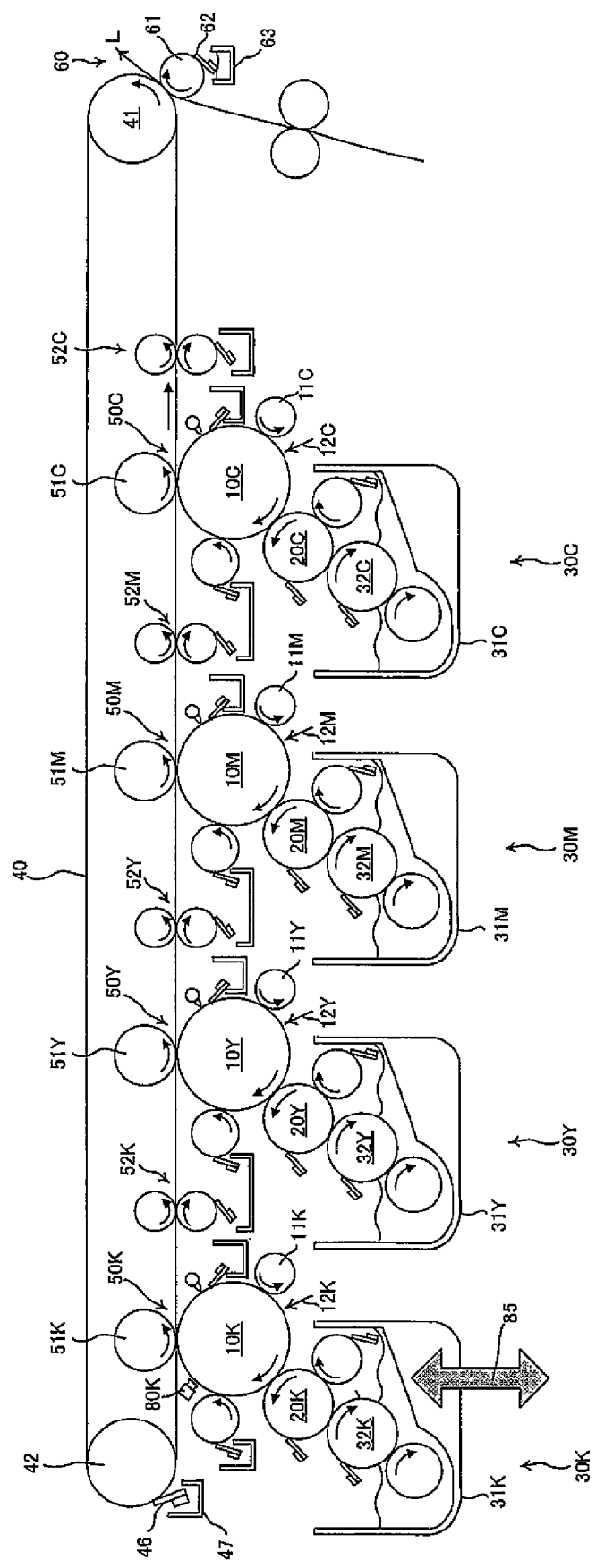
FIG. 16 is a schematic illustration of image forming apparatus according to still another embodiment designed for variable printing, showing principal components thereof.
Figure 17:
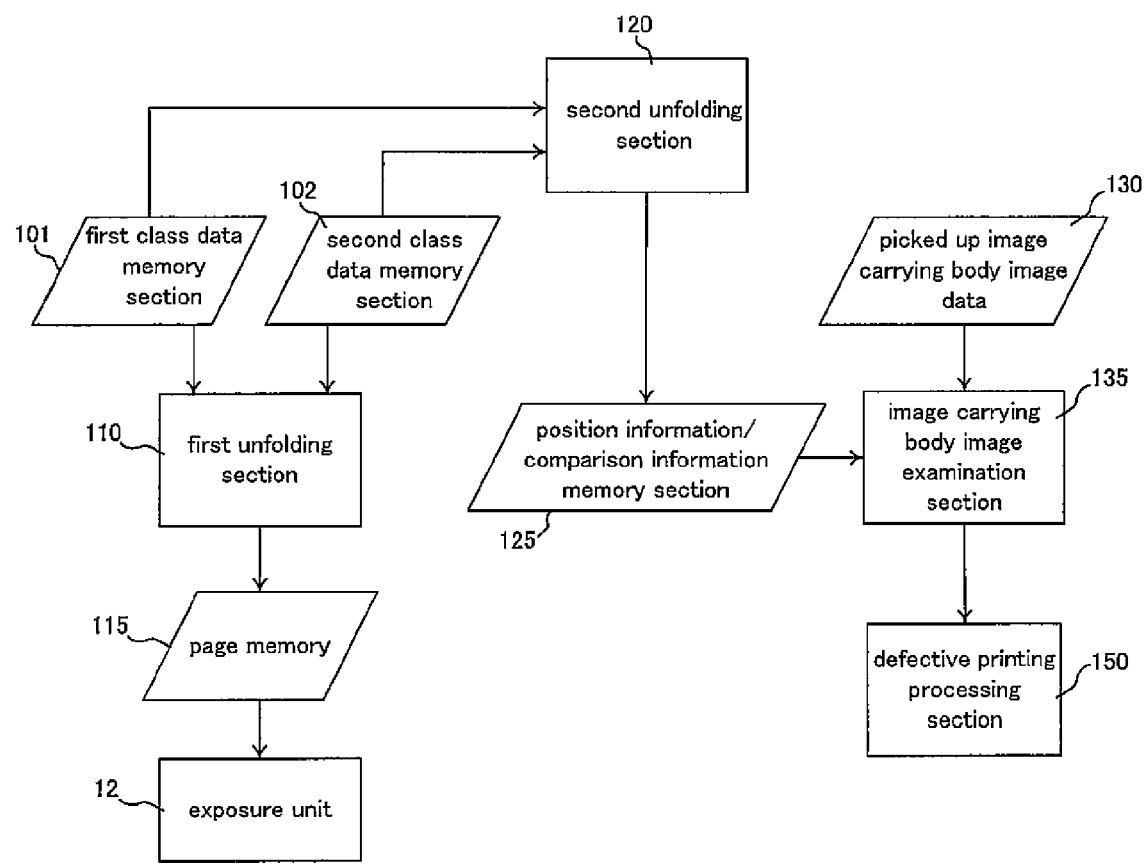
FIG. 17 is a schematic block diagram of image forming apparatus according to still another embodiment designed for variable printing.

Now, still another embodiment of the present invention will be described below. FIG. 16 is a schematic illustration of this embodiment of image forming apparatus that is adapted to execute a variable printing process, showing principal components thereof. FIG. 17 is a schematic block diagram of the arrangement of this embodiment for executing a variable printing process. In FIGS. 16 and 17, the components that are same or similar to those of the preceding embodiments are denoted respectively by the same reference symbols.

This embodiment will be described only in terms of the difference from the first embodiment. The arrangement relating to an intermediate transfer body image pickup section 90 is omitted from this embodiment. In other words, the image on the intermediate transfer body 40 is not checked in this embodiment.

In FIG. 16, the image carrying body 10K can be brought into contact with and moved away from the intermediate transfer body 40 by means of a black image carrying body contact/release mechanism 85 that can drive the entire development unit 30K to move up and down. If, for example, defective printing is detected by way of the picked up image data of the image carrying body image pickup section 80K, the defective image can be prevented from being printed by moving the image carrying body 10K away from the intermediate transfer body 40 by means of the black image carrying body contact/release mechanism 85. Then, the toner on the image carrying body 10K can be collected for reuse.

Now, the flow of data that takes place when this embodiment having the above-described arrangement executes a variable printing process will be described below. FIG. 17 is a schematic block diagram of the arrangement of this embodiment for executing a variable printing process. In FIG. 17, there are shown a first class data memory section 101, a second class data memory section 102, a first unfolding section 110, a page memory 115, an exposure unit 12, a second unfolding section 120, a position information/comparison information memory section 125, picked up image carrying body image data 130, an image carrying body image examination section 135 and a defective printing processing section 150.

FIG. 17 shows the arrangement of the control system of an image forming apparatus according to the present invention. The first class data stored in the first class data memory section 101 are fixed data (common data) such as form data while the second class data stored in the second class data memory section 102 are variable data such as personal information.

As the data stored in the first class data memory section 101 and those stored in the second class data memory section 102 are input to the first unfolding section 110 and the second unfolding section 120, both of them unfold the first class data and the second class data to produce first class image data and second class image data. The first unfolding section 110 and the second unfolding section 120 are arranged so as to be independent from each other.

The first class image data and the second class image data unfolded by the first unfolding section 110 are synthetically combined in the page memory 115 in such a way that the second class image data are embedded in the first class image data.

The synthesized image data produced by combining the first class image data and the second class image data that are unfolded on the page memory 115 are then written to the image carrying body 10 by the exposure unit 12.

The first class image data and the second class image data unfolded by the second unfolding section 120 are sent to the position information/comparison information memory section 125. The position information/comparison information memory section 125 sends out the position information of the second class image data embedded in the first class image data and also the second class image data themselves to the image carrying body image examination section 135 as comparison information. In other words, the position data in the printed image of the second class image data and the contents data of the second class image data are sent to the image carrying body image examination section 135.

The picked up image carrying body image data 130 are picked up image data picked up and prepared by the image carrying body image pickup section 80K and the image carrying body image examination section 135 determines the image to be good or no-good on the basis of the second class image data, using the picked up image data from the image carrying body image pickup section 80, the second class image data and the position data thereof.

As the image is determined to be no-good by the image carrying body image examination section 135 on the basis of the second class image data, the defective printing processing section 150 is notified of the outcome of the determination. The defective printing processing section 150 executes a disposal process by means of an appropriate technique before the defective image is printed on a recording medium. For example, the process that the defective printing processing section 150 executes may include a process of moving the image carrying body 10K away from the intermediate transfer body 40 by means of the black image carrying body contact/release mechanism 85 to prevent the defective image from being printed. Various techniques are conceivable for the process of disposing of a defective image by the defective image processing section 150.

A host computer (not shown) that is connected to an image forming apparatus according to the present invention may be employed to form the first class data memory section 101, the second class data memory section 102 and the second unfolding section 120.

With the above-described arrangement, defective printing can be processed appropriately in variable printing and the operation and the labor cost required to check the printed documents that contain personal information can be reduced. Additionally, since this embodiment makes it possible to detect defective printing on the image carrying body that used to be visually detected by the user who checks the image printed on a sheet of paper, the printing operation can be suspended in an earlier stage to save time as well as toner and paper that will otherwise be wasted due to the defective printing.

Figure 18:
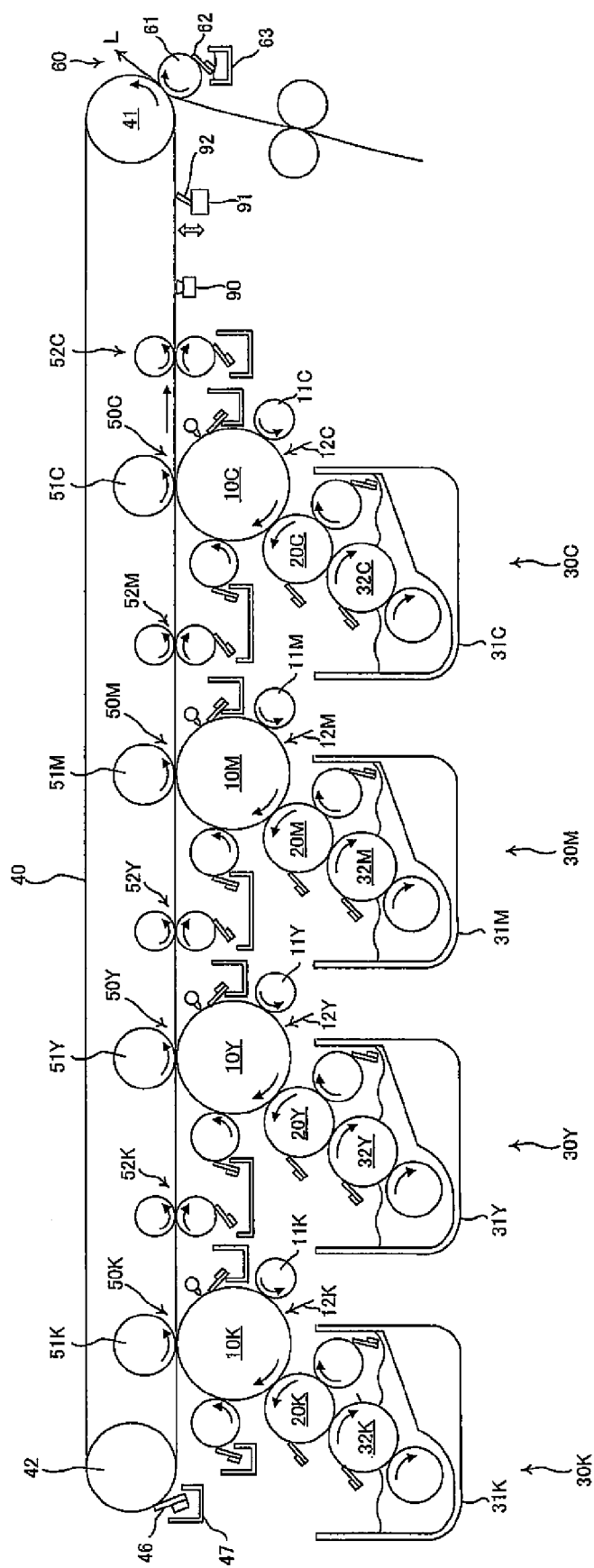
FIG. 18 is a schematic illustration of image forming apparatus according to still another embodiment designed for variable printing, showing principal components thereof.
Figure 19:
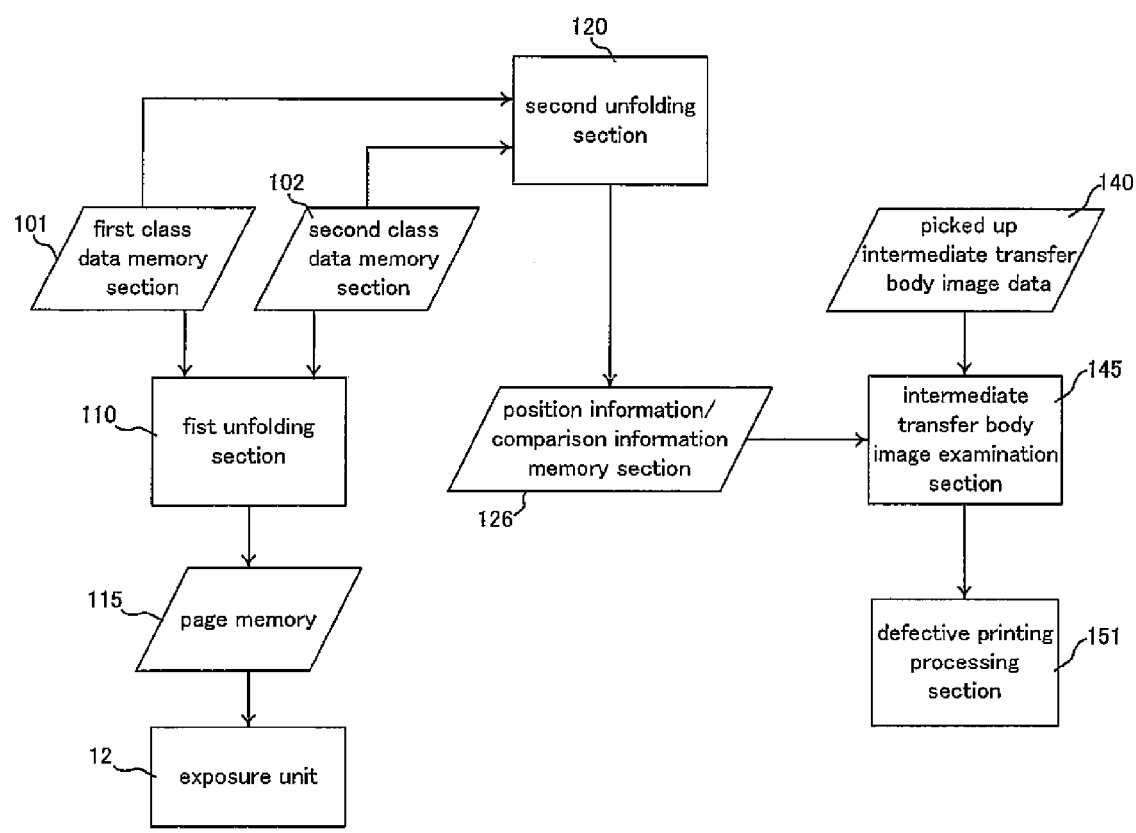
FIG. 19 is a schematic block diagram of image forming apparatus according to still another embodiment designed for variable printing.
Figure 20:
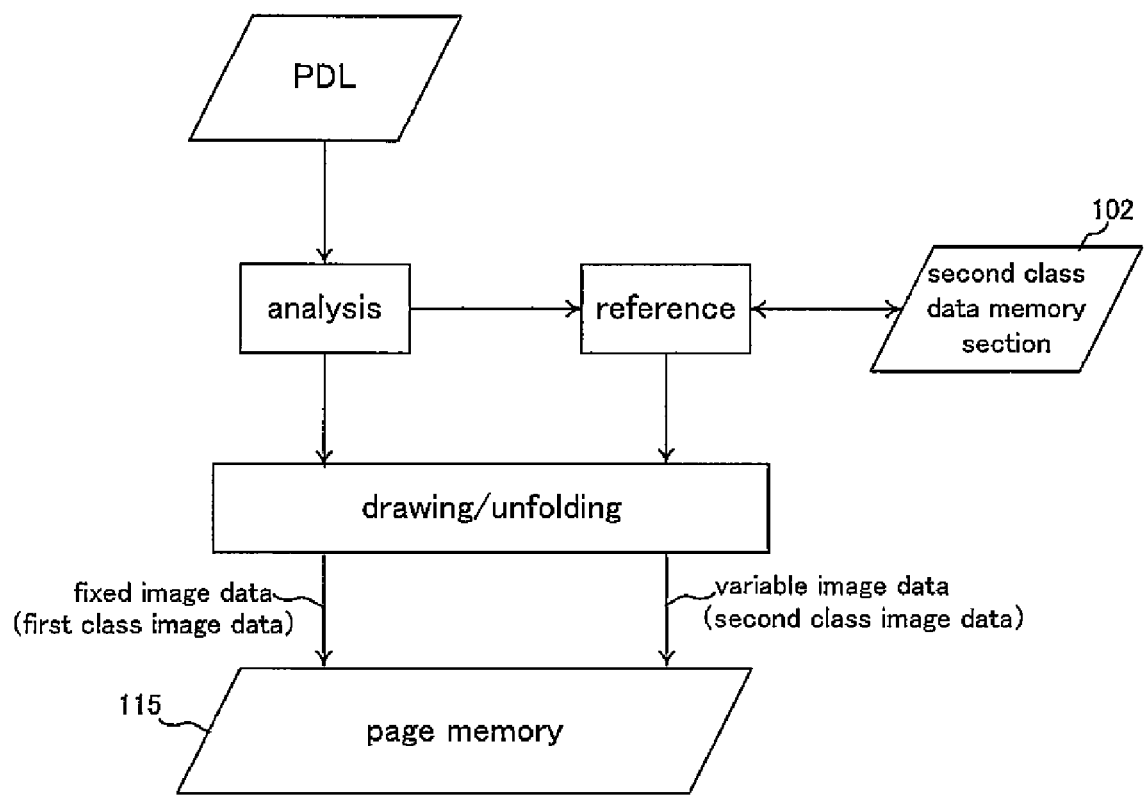
FIG. 20 is a schematic illustration of the arrangement of the unfolding section and its periphery of the inside of image forming apparatus according to still another embodiment of the present invention.

Now, still another embodiment of the present invention will be described below. FIG. 18 is a schematic illustration of this embodiment of image forming apparatus that is adapted to execute a variable printing process, showing principal components thereof. FIG. 19 is a schematic block diagram of the arrangement of this embodiment for executing a variable printing process. FIG. 20 is a schematic illustration of the arrangement of an unfolding section and its periphery in the inside of the image forming apparatus of this embodiment. In FIGS. 18 through 20, the components that are same or similar to those of the preceding embodiments are denoted respectively by the same reference symbols.

This embodiment will be described only in terms of the difference from the first embodiment. The arrangement relating to the image carrying body image pickup section 80K is omitted from this embodiment. In other words, the image on the image carrying body 10 is not checked in this embodiment.

Referring to FIG. 18, an intermediate transfer body image pickup section 90 is arranged to observe the image on the intermediate transfer body 40. More particularly, a color scan camera is employed as the scan camera for picking an image of the image on the intermediate transfer body 40. The scan camera may be a line scan camera formed by using a CCD or a CMOS or an area scan camera.

This embodiment is provided with an intermediate transfer body image scraping off section 91 that can drive cleaning blade 92 to move up and down such so as to bring the cleaning blade 92 into contact with and move it away from the intermediate transfer body 40. If, for example, defective printing is detected by way of the picked up image data of the intermediate transfer body image pickup section 90, the defective image can be prevented from being printed on a recording medium by bringing the cleaning blade 92 into contact with the intermediate transfer body 40 by means of the intermediate transfer body image scraping off section 91 to scrape off the image formed on the intermediate transfer body 40. The cleaning blade 92 may be replaced by a brush or a brush roller.

Now, the flow of data that takes place when this embodiment having the above-described arrangement executes a variable printing process will be described below. FIG. 19 is a schematic block diagram of the arrangement of this embodiment for executing a variable printing process. In FIG. 19, there are shown a first class data memory section 101, a second class data memory section 102, a first unfolding section 110, a page memory 115, an exposure unit 12, a second unfolding section 120, a position information/comparison information memory section 126, picked up intermediate transfer body image data 140, an intermediate transfer body image examination section 145 and a defective printing processing section 151.

FIG. 19 shows the arrangement of the control system of an image forming apparatus according to the present invention. The first class data stored in the first class data memory section 101 are fixed data (common data) such as form data while the second class data stored in the second class data memory section 102 are variable data such as personal information.

As the data stored in the first class data memory section 101 and those stored in the second class data memory section 102 are input to the first unfolding section 110 and the second unfolding section 120, both of them unfold the first class data and the second image data to produce first class image data and second class image data. The first unfolding section 110 and the second unfolding section 120 are arranged so as to be independent from each other.

The first class image data and the second class image data unfolded by the first unfolding section 110 are synthetically combined on the page memory 115 in such a way that the second class image data are embedded in the first class image data.

The synthesized image data produced by combining the first class image data and the second class image data that are unfolded on the page memory 115 are then written to the image carrying body 10 by the exposure unit 12.

The first class image data and the second class image data unfolded by the second unfolding section 120 are sent to the position information/comparison information memory section 126. The position information/comparison information memory section 126 sends out the position information of the second class image data embedded in the first class image data and also the second class image data themselves to the intermediate transfer body image examination section 145 as comparison information. In other words, the position data in the printed image of the second class image data and the contents data of the second class image data are sent to the intermediate transfer body image examination section 145.

The picked up intermediate transfer body image data 140 are picked up image data picked up and prepared by the intermediate transfer body image pickup section 90 and the intermediate transfer body image examination section 145 determines the image to be good or no-good on the basis of the second class image data, using the picked up image data from the intermediate transfer body image pickup section 90, the second class image data and the position data thereof.

As the image is determined to be no-good by the intermediate transfer body image examination section 145 on the basis of the second class image data, the defective printing processing section 151 is notified of the outcome of the determination. The defective printing processing section 151 executes a disposal process by means of an appropriate technique before the defective image is printed on a recording medium. For example, the process that the defective printing processing section 151 executes may include a process of driving the intermediate transfer body image scraping off section 91 to operate and scrape off the toner image on the intermediate transfer body 40 so as to prevent the defective image from being printed.

A host computer (not shown) that is connected to an image forming apparatus according to the present invention may be employed to form the first class data memory section 101, the second class data memory section 102 and the second unfolding section 120.

Now, the operation of the first unfolding section and that of the second unfolding section will be described below. FIG. 20 is a schematic illustration of the arrangement of an unfolding section and its periphery in the inside of the image forming apparatus. Printing data described in a page description language (PDL) includes information on the positional arrangement of the information source of the common image (the first class image) that are common to all the printed sheets and the image data that vary from printed sheet to printed sheet (the second class image). The PDL is analyzed and the information on the first class image data that is provided as a result of analysis is simply unfolded and plotted on the page memory. The information on the second class image data that is provided as a result of analysis is unfolded by referring to the variable data source (the information source on the second class image) according to the information and then plotted on the page memory.

With the above-described arrangement, defective printing can be processed appropriately in variable printing and the operation and the labor cost required to check the printed documents that contain personal information can be reduced. Additionally, this embodiment detects defective printing on an image formed by laying images of different colors so that so-called gradation letters where the color in the letter changes and personal information superimposed on a photograph and using white letters written in white can be detected.

The present invention is described above by way of various embodiments. It should be noted that the above-described embodiments can be combined in various different ways without departing from the scope of the present invention.

An image forming apparatus and a method of controlling the same according to the present invention can appropriately process defective printing in variable printing and reduce the operation and the labor cost required to check the printed documents that contain personal information.

What is claimed is:

1. An image forming apparatus comprising:
   a first class data memory section that stores a first class data that is common to a sheet to be printed;
   a second class data memory section that stores the second class data to be embedded in the first class data at the time of printing, the second class data being different from sheet to sheet to be printed;
   a first unfolding section that unfolds the first class data and the second class data to a first image data;
   a second unfolding section that unfolds the first class data and the second class data to a second image data, the second unfolding section being different from the first unfolding section;
   a first image carrier that carries a first image formed by the first image data unfolded by the first unfolding section;
   a second image carrier that carries a second image formed by the first image data unfolded by the first unfolding section;
   a transfer medium that is held in contact with the first image carrier and the second image carrier and to which the first image formed on the first image carrier and the second image formed on the second image carrier are transferred;
   an image pickup section of the image carrier that picks up the first image of the first image carrier and prepares a first picked up image data;
   an image pickup section of the transfer medium that picks up an image transferred to the transfer medium and prepares a second picked up image data;
   an image examination section of the image carrier that examines an image corresponding to the second class data by comparing the second image data unfolded by the second unfolding section and the first picked up image data prepared by the image pickup section of the image carrier; and
   an image examination section of the transfer medium that examines an image corresponding to the first class data by comparing the second image data unfolded by the second unfolding section and the second picked up image data prepared by the image pickup section of the transfer medium.

2. The apparatus according to claim 1, further comprising:
   a first color conversion section that is arranged in the first unfolding section;
   a second color conversion section that is arranged in the second unfolding section, the second color conversion section being different from the first color conversion section; and
   a third color conversion section that is arranged in the second unfolding section, the third color conversion section being different from the first color conversion section and the second color conversion section.

3. The apparatus according to claim 2, wherein a resolution of the first image data generated by the first color conversion section and a resolution of the second image data generated by the second color conversion section are different from each other.

4. The apparatus according to claim 3, wherein the resolution of the first image data generated by the first color conversion section and a resolution of the third image data generated by the third color conversion section are different from each other.

5. The apparatus according to claim 4, wherein the resolution of the second image data generated by the second color conversion section and the resolution of the third image data generated by the third color conversion section are different from each other.

6. The apparatus according to claim 1, further comprising:
   a second defective printing processing section that disposes of the image corresponding to the second class data when the image is determined to be defective by the image examination section of the image carrier.

7. The apparatus according to claim 6, wherein the second defective printing processing section is a first image carrier contact/release mechanism that brings the first image carrier into contact with and moves the first image carrier away from the transfer medium.

8. The apparatus according to any one of claims 1 through 7, further comprising:
   a first defective printing processing section that disposes of the image corresponding to the first class data when the image is determined to be defective by the image examination section of the transfer medium.

9. The apparatus according to claim 8, wherein the first defective printing processing section is a cleaning blade that scrapes off the image formed on the transfer medium.

10. The apparatus according to claim 1, wherein the first image is formed by a liquid developer containing carrier liquid and toner particles.

11. The apparatus according to claim 10, further comprising:
- a squeezing section that removes the carrier liquid from the first image carrier and the second image carrying body.

12. The apparatus according to claim 10, further comprising:
- a squeezing device that removes the carrier liquid from the transfer medium.

13. A method of controlling an image forming apparatus comprising:
- storing a first class data that is common to a sheet to be printed in a first class data memory section;
- storing a second class data to be embedded in the first class data at the time of printing in a second class data memory section, the second class data being different from sheet to sheet to be printed;
- unfolding the first class data and the second class data to a first image data by means of a first unfolding section;
- unfolding the first class data and the second class data to a second image data by means of a second unfolding section that is different from the first unfolding section;
- carrying a first image formed by the first image data unfolded by the first unfolding section on a first image carrier;
- carrying a second image formed by the first image data unfolded by the first unfolding section on a second image carrier;
- transferring the first image formed on the first image carrier and the second image formed on the second image carrier to a transfer medium that is held in contact with the first image carrier and the second image carrier;
- picking up the first image of the first image carrier and preparing a first picked up image data by means of an image pickup section of the image carrier;
- picking up an image transferred to the transfer medium and preparing a second picked up image data by means of an image pickup section of the transfer medium;
- examining an image corresponding to the second class data by comparing the second image data unfolded by the second unfolding section and the first picked up image data prepared by image pickup section of the image carrier by means of an image examination section of the image carrier; and
- examining an image corresponding to the first class data by comparing the second image data unfolded by the second unfolding section and the second picked up image data prepared by the image pickup section of the transfer medium by means of a image examination section of the transfer medium.

14. The method according to claim 13, further comprising:
disposing of the image corresponding to the second class data by means of a second defective printing processing section when the image is determined to be defective by the image examination section of the image carrier.

15. The method according to claim 13, further comprising:
disposing of the image corresponding to the first class data by means of a first defective printing processing section when the image is determined to be defective by the image examination section of the image carrier.

* * * * *